US012652183B2

(12) United States Patent
Cupala et al.

(10) Patent No.: US 12,652,183 B2
(45) Date of Patent: Jun. 9, 2026

(54) AUTO-GENERATED COLLABORATIVE COMPONENTS FOR COLLABORATION OBJECT

(71) Applicant: Microsoft Technology Licensing, LLC, Redmond, WA (US)

(72) Inventors: Shiraz J. Cupala, Snohomish, WA (US); Daniel Gabriel Zarzar, Austin, TX (US); Daniel P. Costenaro, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/348,310

(22) Filed: Jul. 6, 2023

(65) Prior Publication Data

US 2024/0380626 A1     Nov. 14, 2024

Related U.S. Application Data

(63) Continuation-in-part of application No. 18/144,538, filed on May 8, 2023, now abandoned.

(51) Int. Cl.
H04L 12/18 (2006.01)

(52) U.S. Cl.
CPC ...... H04L 12/1818 (2013.01); H04L 12/1831 (2013.01)

(58) Field of Classification Search
CPC ........................ H04L 12/1818; H04L 12/1831
See application file for complete search history.

(56) References Cited

U.S. PATENT DOCUMENTS

| | | | |
|---|---|---|---|
| 6,952,660 B1 | 10/2005 | Matheson | |
| 7,386,535 B1 | 6/2008 | Kalucha et al. | |
| 7,958,453 B1 | 6/2011 | Taing | |
| 8,769,012 B1 | 7/2014 | Shah et al. | |
| 9,983,759 B1 | 5/2018 | Dhawan et al. | |
| 10,389,769 B2 * | 8/2019 | Gudipaty | G06Q 10/10 |
| 11,030,585 B2 | 6/2021 | Nelson et al. | |
| 11,240,278 B1 | 2/2022 | Wang et al. | |
| 11,501,057 B2 * | 11/2022 | Laborczfalvi | G06F 40/134 |

(Continued)

OTHER PUBLICATIONS

Notice of Allowance mailed on Jul. 10, 2024, in U.S. Appl. No. 18/154,514, 08 pages.

(Continued)

*Primary Examiner* — Nazia Naoreen

(57)     ABSTRACT

Systems and methods for generating a collaboration object are provided. In particular, a computing device may detect an intent to generate a meeting invitation for a meeting by a meeting organizer via a first application, provide a meeting invitation template including one or more collaborative components, receive a first set of collaborative components, cause the meeting invitation to be sent to at least one invitee via the first application, in response to causing the meeting invitation to be sent to at least one invitee, generate the collaboration object associated with the meeting based on the first set of collaborative components, determine one or more additional collaborative components from the plurality of collaborative components that are relevant to the meeting, and update the collaboration object to include the one or more additional collaborative components.

20 Claims, 18 Drawing Sheets

(56) References Cited

U.S. PATENT DOCUMENTS

| | | | |
|---|---|---|---|
| 11,689,379 B2* | 6/2023 | Daredia | G06F 16/483 |
| | | | 709/204 |
| 11,824,670 B2* | 11/2023 | Jin | G06F 3/04815 |
| 2003/0036941 A1 | 2/2003 | Leska et al. | |
| 2003/0135565 A1 | 7/2003 | Estrada | |
| 2005/0097440 A1 | 5/2005 | Lusk et al. | |
| 2006/0010197 A1 | 1/2006 | Ovenden | |
| 2006/0026502 A1 | 2/2006 | Dutta | |
| 2006/0242154 A1 | 10/2006 | Rawat et al. | |
| 2006/0242639 A1 | 10/2006 | Manion et al. | |
| 2009/0006982 A1 | 1/2009 | Curtis et al. | |
| 2009/0083637 A1 | 3/2009 | Skakkebaek et al. | |
| 2009/0222741 A1 | 9/2009 | Shaw et al. | |
| 2011/0010332 A1 | 1/2011 | Vasudevan et al. | |
| 2011/0302506 A1 | 12/2011 | Noyes et al. | |
| 2013/0091205 A1 | 4/2013 | Kotler et al. | |
| 2013/0191896 A1 | 7/2013 | Adderly et al. | |
| 2014/0066044 A1 | 3/2014 | Ramnani et al. | |
| 2014/0082522 A1 | 3/2014 | Gunderson et al. | |
| 2014/0129639 A1 | 5/2014 | Burge | |
| 2014/0280463 A1 | 9/2014 | Hunter et al. | |
| 2014/0310345 A1 | 10/2014 | Megiddo et al. | |
| 2015/0135094 A1 | 5/2015 | Donneau-golencer et al. | |
| 2015/0149929 A1 | 5/2015 | Shepherd et al. | |
| 2015/0156153 A1 | 6/2015 | Deselaers et al. | |
| 2016/0112476 A1 | 4/2016 | Gudipaty | |
| 2016/0342571 A1 | 11/2016 | Voss et al. | |
| 2017/0076046 A1 | 3/2017 | Barnes et al. | |
| 2017/0163752 A1 | 6/2017 | Kaledhonkar et al. | |
| 2017/0279859 A1 | 9/2017 | Pogorelik | |
| 2017/0315974 A1 | 11/2017 | Kong et al. | |
| 2017/0364866 A1 | 12/2017 | Steplyk et al. | |
| 2018/0131731 A1 | 5/2018 | Jones et al. | |
| 2018/0203577 A1 | 7/2018 | Astavans et al. | |
| 2018/0260790 A1* | 9/2018 | Connolly | G06Q 10/1095 |
| 2018/0336520 A1 | 11/2018 | Davis et al. | |
| 2018/0337963 A1 | 11/2018 | Faulkner et al. | |
| 2019/0065450 A1 | 2/2019 | Bhogal et al. | |
| 2019/0108492 A1 | 4/2019 | Nelson et al. | |
| 2019/0288968 A1 | 9/2019 | Chilakamarri et al. | |
| 2019/0312742 A1 | 10/2019 | Albrecht | |
| 2020/0076634 A1 | 3/2020 | Akolkar et al. | |
| 2020/0410457 A1 | 12/2020 | Sexauer et al. | |
| 2021/0168177 A1* | 6/2021 | Henderson | G06F 3/167 |
| 2021/0241865 A1 | 8/2021 | Bhattacharya et al. | |
| 2022/0261760 A1 | 8/2022 | Cupala et al. | |
| 2022/0263675 A1 | 8/2022 | Cupala et al. | |
| 2023/0155851 A1 | 5/2023 | Cupala et al. | |
| 2024/0378566 A1 | 11/2024 | Cupala | |

OTHER PUBLICATIONS

Non-Final Office Action mailed on Mar. 21, 2024, in U.S. Appl. No. 18/154,514, 10 pages.

Notice of Allowance mailed on Dec. 18, 2023, in U.S. Appl. No. 17/179,186, 9 pages.

"Final Office Action Issued in U.S. Appl. No. 17/179,151", Mailed Date: Apr. 3, 2023, 26 Pages.

"Non Final Office Action Issued in U.S. Appl. No. 17/179,151", Mailed Date: Dec. 22, 2022, 23 Pages.

"Final Office Action Issued in U.S. Appl. No. 17/179,186", Mailed Date: Mar. 25, 2022, 20 Pages.

"Non Final Office Action Issued in U.S. Appl. No. 17/179,186", Mailed Date: Oct. 1, 2021, 17 Pages.

"Notice of Allowance Issued in U.S. Appl. No. 17/179,186", Mailed Date: Oct. 13, 2022, 16 Pages.

Bendel, et al., "WatchMyPhone—Providing Developer Support for Shared User Interface Objects in Collaborative Mobile Applications", In proceedings of 2012 IEEE International Conference on Pervasive Computing and Communications Workshops, Mar. 19, 2012, pp. 166-171.

"International Search Report and Written Opinion Issued in PCT Application No. PCT/US22/013810", Mailed Date: Mar. 25, 2022, 12 Pages.

"International Search Report and Written Opinion Issued in PCT Application No. PCT/US22/013812", Mailed Date: Mar. 28, 2022, 12 Pages.

"Non Final Office Action Issued in U.S. Appl. No. 17/179,186", Mailed Date: May 26, 2023, 23 Pages.

"Notice of Allowance Issued in U.S. Appl. No. 17/179,151", Mailed Date: Jul. 31, 2023, 16 Pages.

International Search Report and Written Opinion received for PCT Application No. PCT/US2024/027329, Jul. 19, 2024, 17 pages.

Non-Final Office Action mailed on Aug. 1, 2024, in U.S. Appl. No. 18/144,538, 27 pages.

Cho, et al., "Suggestion for Collaboration-Based UI/UX Development Model through Risk Analysis", Journal of Information Processing Systems, vol. 16, Issue 6, Dec. 31, 2020, pp. 1372-1390.

Nguyen, et al., "User Experience in Collaborative Extended Reality: Overview Study", Virtual Reality and Augmented Reality, Oct. 27, 2020, pp. 41-70.

Notice of Allowance mailed on Apr. 15, 2025, in U.S. Appl. No. 18/527,633, 19 pages.

International Preliminary Report on Patentability (Chapter I) received for PCT Application No. PCT/US2024/027329, Mailed on Nov. 20, 2025, 12 Pages.

* cited by examiner

Figure 5A:
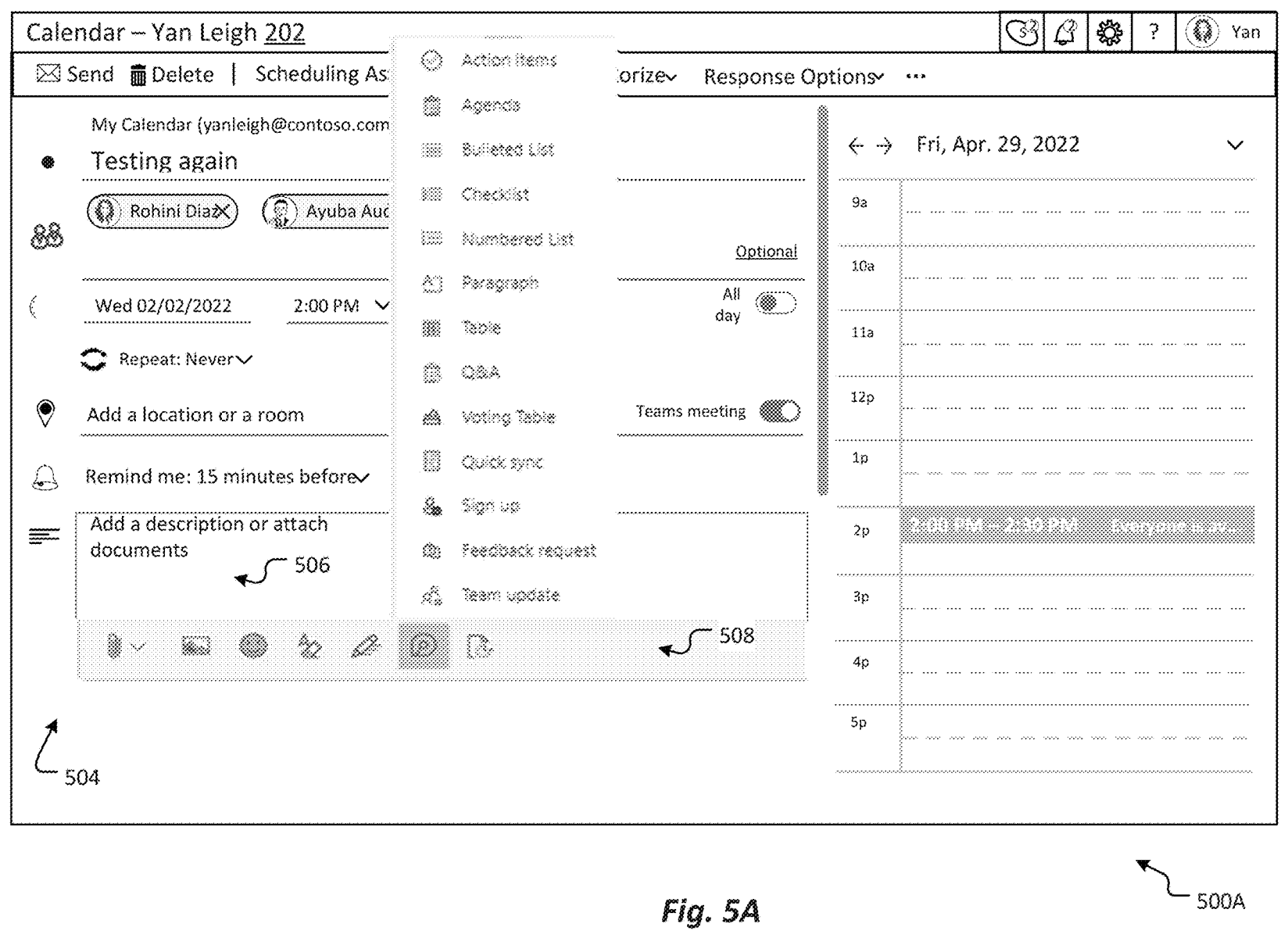

Calendar — Yan Leigh 202

☒ Send  🗑 Delete  |  Scheduling As  ...orize∨  Response Options∨  ...

My Calendar (yanleigh@contoso.com

• Testing again

◉ Rohini Diaz ✕

88  ⊙ Ayuba Aud ( Wed 02/02/2022    2:00 PM ∨  >

⟳ Repeat: Never∨

◉ Add a location or a room

⌂ Remind me: 15 minutes before∨

≡ Add a description or attach
    documents

⊘ Action Items
▦ Agenda
▦ Business List
▦ Checklist
▦ Numbered List
A⌐ Paragraph
▦ Table
◎ Q&A
◀ Voting Table
▦ Quick sync
✎ Sign Up
☺ Feedback request
Aა Team update

↱ 506

▣∨  □  ⬤  ▣  ⬤  ↱

↱ 504

Optional

All  ⬤
day

Teams meeting  ⬤

↱ 508

← → Fri, Apr. 29, 2022    >

AUTO-GENERATED COLLABORATIVE COMPONENTS FOR COLLABORATION OBJECT

BACKGROUND

Meetings, whether in-person and/or virtual, are widely utilized in business and personal communications. Organizing such meetings typically involves multiple exchanges of content and messages between users before, during, and after the meeting. However, even scheduled meetings fall prey to disorganization or miscommunication regarding agenda items, participant roles, time allotments, and the like. For scheduled meetings, for example, an organizer may send a sample agenda, suggested presenters, documents, and the like, via a message (e.g., an email or a chat message) to multiple invitees. The invitees and the meeting organizer may then communicate via a message thread (or threads) in which users may exchange multiple messages regarding suggested agenda or action items, notes or suggestions, new or revised documents, and the like. The meeting organizer and the attendees must then sift through multiple messages to collate information for an organized discussion during the meeting. Not only so, but whether or not a meeting is scheduled, attendees often maintain separate notetaking during the meeting, which may result in disparate impressions and objectives both during and after the meeting. As a result, collaboration between users before, during, and after a meeting is often inefficient and unproductive. Additionally, different collaborative components (e.g., agenda, meeting note, and/or action item components) of the meeting for receiving and organizing meeting content may be appropriate depending on a type of the application being used to access the meeting and when it is being accessed (e.g., before, during, or after the meeting).

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

In accordance with examples of the present disclosure, a persistent collaboration object may be configured to enable users to dynamically collaborate before, during, and after a meeting.

In accordance with at least one example of the present disclosure, a method for generating a collaboration object is provided. The method may include detecting an intent to generate a meeting invitation for a meeting by a meeting organizer via a first application, providing a meeting invitation template including one or more collaborative components, and receiving a first set of collaborative components. The first set of collaborative components includes one or more collaborative components selected from a plurality of collaborative components, and each collaborative component provides functionality for concurrent multi-user interaction. The method may further include causing the meeting invitation to be sent to at least one invitee via the first application, in response to causing the meeting invitation to be sent to at least one invitee, generating the collaboration object associated with the meeting based on the first set of collaborative components, determining one or more additional collaborative components from the plurality of collaborative components that are relevant to the meeting, and updating the collaboration object to include the one or more additional collaborative components.

In accordance with at least one example of the present disclosure, a computing device for generating a collaboration object is provided. The computing device may include a processor and a memory having a plurality of instructions stored thereon that, when executed by the processor, causes the computing device to detect an intent to generate a meeting invitation for a meeting by a meeting organizer via a first application, provide a meeting invitation template including one or more collaborative components, receive a first set of collaborative components, the first set of collaborative components including one or more collaborative components selected from a plurality of collaborative components, each collaborative component providing functionality for concurrent multi-user interaction, cause the meeting invitation to be sent to at least one invitee via the first application, in response to the meeting invitation being sent to at least one invitee, generate the collaboration object associated with the meeting based on the first set of collaborative components, determine one or more additional collaborative components from the plurality of collaborative components that are relevant to the meeting using a generative machine learning model, and update the collaboration object to include the one or more additional collaborative components.

In accordance with at least one example of the present disclosure, a non-transitory computer-readable medium storing instructions for generating a collaboration object is provided. The instructions when executed by one or more processors of a computing device, cause the computing device to perform a method comprising detecting an intent to generate a meeting invitation for a meeting via a first application, providing a meeting invitation template including one or more collaborative components, receiving a selection of one or more collaborative components, the one or more collaborative components including an agenda collaborative component, note collaborative component, and action item collaborative component, each collaborative component providing functionality for concurrent multi-user interaction, causing the meeting invitation to be sent to at least one invitee via the first application, in response to the meeting invitation being sent to at least one invitee, generating the collaboration object associated with the meeting based on the one or more selected collaborative components, determining one or more additional collaborative components that are relevant to the meeting based on temporal factors and/or contextual factors using a generative machine learning model, and updating the collaboration object to include the one or more additional collaborative components.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

FIGS. 5A and 5B depict an exemplary user interface of a calendar/messaging application for generating a meeting invitation with one or more collaborative components in accordance with examples of the present disclosure;

DETAILED DESCRIPTION

Figure 1:
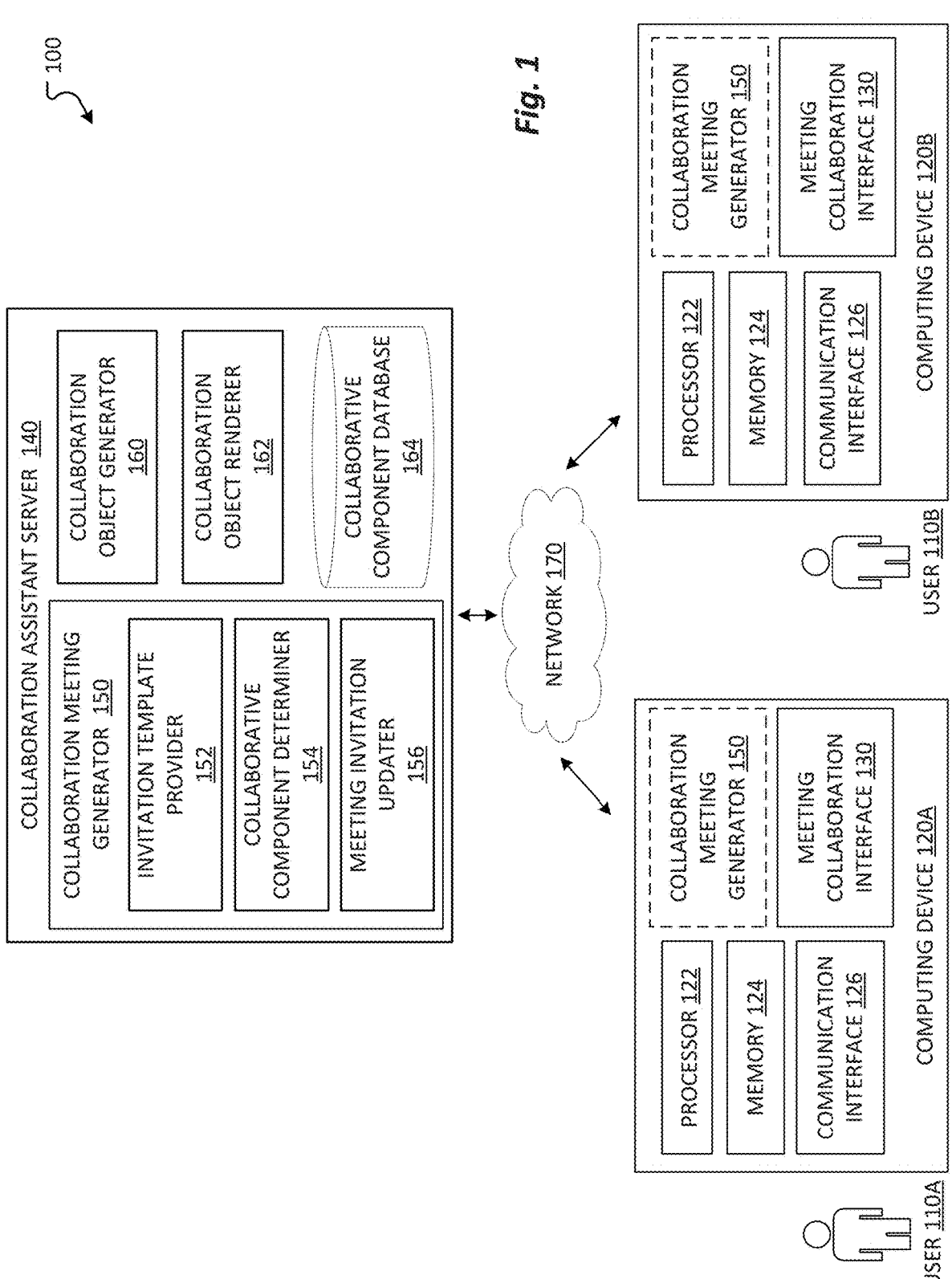
FIG. 1 depicts a block diagram of an example of an operating environment in which a collaboration assistant server may be implemented in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Traditionally, meetings are widely utilized in business and personal communications, whether in-person and/or virtual. Organizing such meetings typically involves multiple exchanges of content and messages between users before, during, and after the meeting. However, scheduled meetings may fall prey to disorganization or miscommunication regarding agenda items, participant roles, time allotments, and the like. For scheduled meetings, for example, an organizer may send a sample agenda, suggested presenters, documents, and the like, via a message (e.g., an email or a chat message) to multiple invitees before the meeting. The invitees and the meeting organizer may then communicate via a message thread (or threads) in which users may exchange multiple messages regarding suggested agenda or action items, notes or suggestions, new or revised documents, and the like. The meeting organizer and the attendees must then sift through multiple messages to collate information for an organized discussion during the meeting. Not only so, attendees often maintain separate notetaking during the meeting, which may result in disparate impressions and objectives both during and after the meeting. As a result, collaboration between users before, during, and after a meeting is often inefficient and unproductive.

In accordance with examples of the present disclosure, a collaboration object configured to enable users to dynamically collaborate before, during, and after a meeting is provided. In aspects, the collaboration object links content generated before, during, and after the meeting in a single location. The content may broadly include linked apps (e.g., first-party apps such as Microsoft® Forms, Viva Sales, etc. and/or third-party apps such as Trello™, Salesforce™, etc.), linked content (e.g., YouTube videos, websites, webpages, shared documents, etc.), static content (e.g., attached documents, presentations, images, videos, etc.), created content (e.g., meeting recordings, whiteboard sessions, etc.), dynamic content (e.g., collaborative components), text content (e.g., chat threads, call transcripts, etc.), and the like. The collaboration object may be available from a variety of application platforms, enabling and persisting real-time editing and collaboration before, during and after the meeting.

In aspects, dynamic content may refer to content that is collaboration enabled and static content may refer to content that is not collaboration enabled. Edits (e.g., additions, deletions, changes) to collaboration-enabled content may be reflected in near real-time across user systems. For example, while an edit is being made to dynamic content on one user system, the edit may be reflected at substantially (or nearly) the same time on another user system. "Near" real-time (or substantially real-time) may account for a minimal delay associated with transmission and synchronization of changes due to resource availability, processing speeds, network bandwidth, and the like. In contrast, edits to static content are not reflected in near real-time across user systems. This is not to be confused with the nature of the content itself, however. For instance, a video may be referred to herein as "static content" if the video is not collaboration enabled, regardless of whether the video could be referred to as dynamic in other contexts.

In aspects, a meeting organizer may generate a meeting invitation with one or more collaborative components for receiving and organizing meeting content. For example, a collaborative component may be an agenda component, a note component, and an action item component. Once the meeting invitation is sent to one or more invitees, a collaboration object associated with the meeting is generated and the one or more collaborative components selected by the organizer to be added to the meeting invitation are stored on a collaboration platform server. In aspects, one or more additional collaborative components that are deemed relevant to the meeting may be determined at backend and stored. It should be appreciated that the collaboration object is a central platform that holds pointers to meeting content (e.g., one or more collaborative components and its content) associated with a meeting. For example, one or more additional collaborative components may be generated based on temporal factors (e.g., before, during, or after the meeting) and/or contextual factors (e.g., a type of application, a type of meeting, or shared contents) using, for example, one or more generative machine learning models (e.g., Large Language Model (LLM)). It should be appreciated that an additional collaborative component may be deemed relevant to the meeting if additional collaborative components are likely to be needed or useful before, during, and after the meeting. In other words, this allows for customization at each stage of the meeting lifecycle across multiple applications, while keeping contents of the meeting together. For example, a different combination of collaborative components may be retrieved from the collaboration object to be provided to the organizer and invitees before, during, and after the meeting. By actively generating one or more collaborative components that are predicted to be needed or useful before, during, and after the meeting, it allows the one or more collaborative components to be rendered more efficiently across multiple applications at different stages of the meeting. In aspects, the organizer and invitees may collaborate on the one or more collaborative components retrieved from the collaboration object persistently and in real-time before, during, and after the meeting. For example, the organizer and invitees may edit contents of the one or more collaborative components. While an edit is being made to contents on one user system, the edit may be reflected at substantially or nearly the same time on another user system. Near real-time or substantially real-time may account for a minimal delay associated with transmission and synchronization of changes due to resource availability, processing speeds, network bandwidth, and the like.

It should be appreciated that although, for exemplary purposes, described embodiments generally relate to messaging applications, e.g., such as email applications, chat applications, collaborative platforms, and the like, the present methods and systems are not so limited. For example, interactive components described herein may be used to provide collaborative experiences in applications other than messaging applications, such as word processing applications, spreadsheet applications, notebook applications, presentation applications, instant messaging or chat applications, social networking platforms, and the like.

FIG. 1 depicts a block diagram of an example of an operating environment 100 in which a collaboration assistant server may be implemented in accordance with examples of the present disclosure. To do so, the operating environment 100 includes one or more computing devices 120 associated with the users 110. The operating environment 100 further include one or more remote devices, such as a collaboration assistant server 140, that are communicatively coupled to the computing device 120 via a network 170. The network 170 may include any kind of computing network including, without limitation, a wired or wireless local area network (LAN), a wired or wireless wide area network (WAN), and/or the Internet.

The collaboration assistant server 140 includes a collaboration meeting generator 150, a collaboration object generator 160, and a collaboration object renderer 162. The collaboration meeting generator 150 is configured to facilitate generating a meeting invitation for a meeting with one or more collaborative components and transmitting the meeting invite to one or more invitees. It should be appreciated that the meeting invitation may be requested to be generated by a meeting organizer (e.g., user 210A) via a first application (e.g., a calendar or messaging application) that is being executed on the computing device 120A. To do so, the collaboration meeting generator 150 further includes an invitation template provider 152, a collaborative component determiner 154, and a meeting invitation updater 156. However, it should be appreciated that some aspects of the collaboration meeting generator 150 may be executed on the computing device 120.

The invitation template provider 152 is configured to provide a meeting invitation template via the first application. For example, the meeting invitation template may include text fields for inputting meeting parameters, such as a meeting title, invitees, and a collaborative platform for the meeting. The meeting invitation template may further include a description field for inputting a meeting description. Additionally, the meeting invitation template may include a tool bar for adjusting text formatting of the meeting description and/or attaching files (e.g., documents and images) to the meeting invitation. Furthermore, the meeting invitation template may include one or more collaborative components that are selectable by the organizer to be added to the meeting invitation. For example, the collaborative components may include agenda, meeting notes, and action items.

The collaborative component determiner 154 is configured to determine one or more collaborative components selected by the organizer. For example, the meeting organizer may select an agenda collaborative component to be added to the meeting invitation to help the invitees to prepare for the meeting and to guide them through the meeting.

The meeting invitation updater 156 is configured to update the meeting invitation template to populate the one or more selected collaborative components. In some aspects, the one or more selected collaborative components may be populated in the description field.

The collaboration object generator 160 is configured to generate a collaboration object associated with the meeting. As described above, the collaboration object is a central platform that holds pointers to meeting content (e.g., one or more collaborative components and its content) associated with the meeting and provides appropriate meeting content for the organizer and invitees to collaborate before, during, and after the meeting. To do so, the collaboration object generator 160 is configured to parse one or more selected collaborative components from the meeting invitation and writes to the collaboration object. Additionally, the collaboration object generator 160 is configured to determine one or more additional collaborative components that are deemed relevant to the meeting and writes the additional collaborative components to the collaboration object. In other words, the collaboration object is updated to include the additional collaborative components. It should be appreciated that the collaboration object generator 160 may determine the additional collaborative components based on temporal factors (e.g., during or after the meeting) and/or contextual factors (e.g., a type of application, a type of meeting, or shared contents). For example, an additional collaborative component may be deemed relevant to the meeting if the additional collaborative component is likely to be needed or useful before, during, and after the meeting.

The collaboration object renderer 162 is configured to render one or more collaborative components in a meeting collaboration interface 130. As described above, the collaboration object holds pointers to each collaborative component associated with the meeting. This allows different combinations of collaborative components to be retrieved from the collaboration object and provided to the organizer and invitee before, during, and after the meeting. The collaboration object renderer 162 is configured to render one or more collaborative components in various applications. In aspect, the collaboration object may be associated with metadata for generating one or more collaborative user experiences (UXs). A collaborative UX may customize the portable interface and functionality of the collaboration object for a particular hosting application. In aspects, while different collaborative UXs may exhibit similar functionality for supporting collaborative user interactions, a collaborative UX may be customized so as to exhibit a similar look and/or feel (e.g., theming, color scheme, layout, design elements, etc.) to a user interface associated with a selected application. That is, the collaborative UX may appear to be native to the selected application.

When an indication to join the meeting associated with the collaboration object via a second application is received, the collaboration object renderer 162 is configured to determine one or more collaborative components that are deemed relevant based on context. For example, one or more additional collaborative components may be determined based on temporal factors (e.g., during or after the meeting) and/or contextual factors (e.g., a type of application, a type of meeting, or shared contents). The collaboration object renderer 162 is configured to retrieve the one or more relevant collaborative components and its associated metadata from the collaboration object. The collaboration object renderer 162 is further configured to render a second collaborative UX customized for the second application based on the metadata to provide the one or more relevant collaborative components.

For example, when a meeting invitation was created, only an agenda may have been selected to be added to the meeting invitation to help the invitees to prepare for the meeting and to guide them through the meeting. However, a meeting note component is likely be needed or useful during the meeting to provide a common place for the organizer and invitees to take, share, and/or edit notes during the meeting. Additionally, an action item component may be useful during or after the meeting. For example, the organizer and invitees may add one or more action items (e.g., tasks and deadlines) during the meeting, which may be edited, deleted, or confirmed by the organizer or an invitee. In such an example, in addition to the agenda, the collaboration assistant server 140 may retrieve the meeting note component and the action item component from the collaboration object. In other words, the retrieved collaborative components may include additional collaborative components from the one or more collaborative component initially added to the meeting invitation.

Figure 2A:
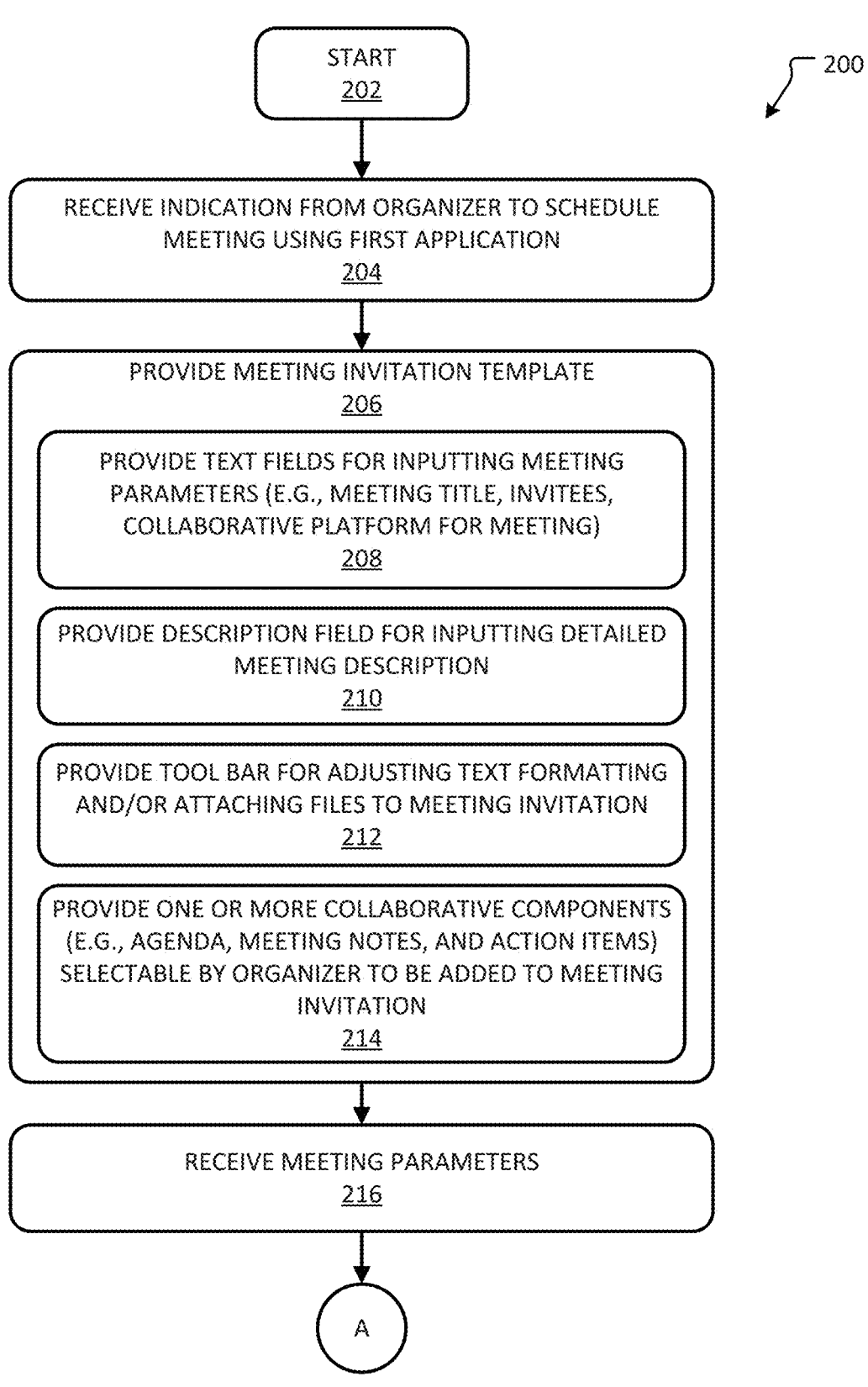
FIGS. 2A-C depict a flowchart of an example method of generating a collaboration object associated with a meeting based a meeting invitation with one or more collaborative components in accordance with examples of the present disclosure.
Figure 2B:
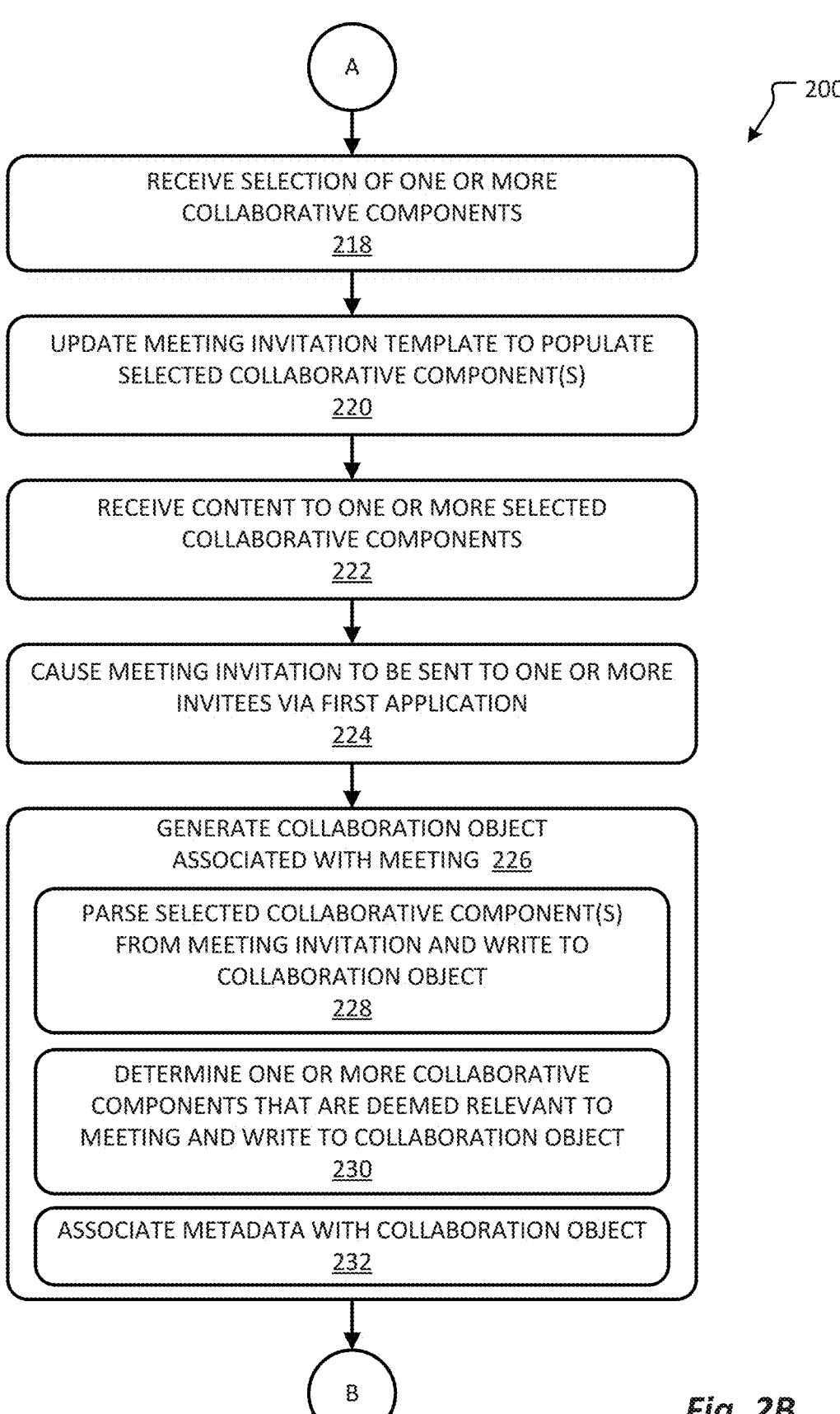
Figure 2C:
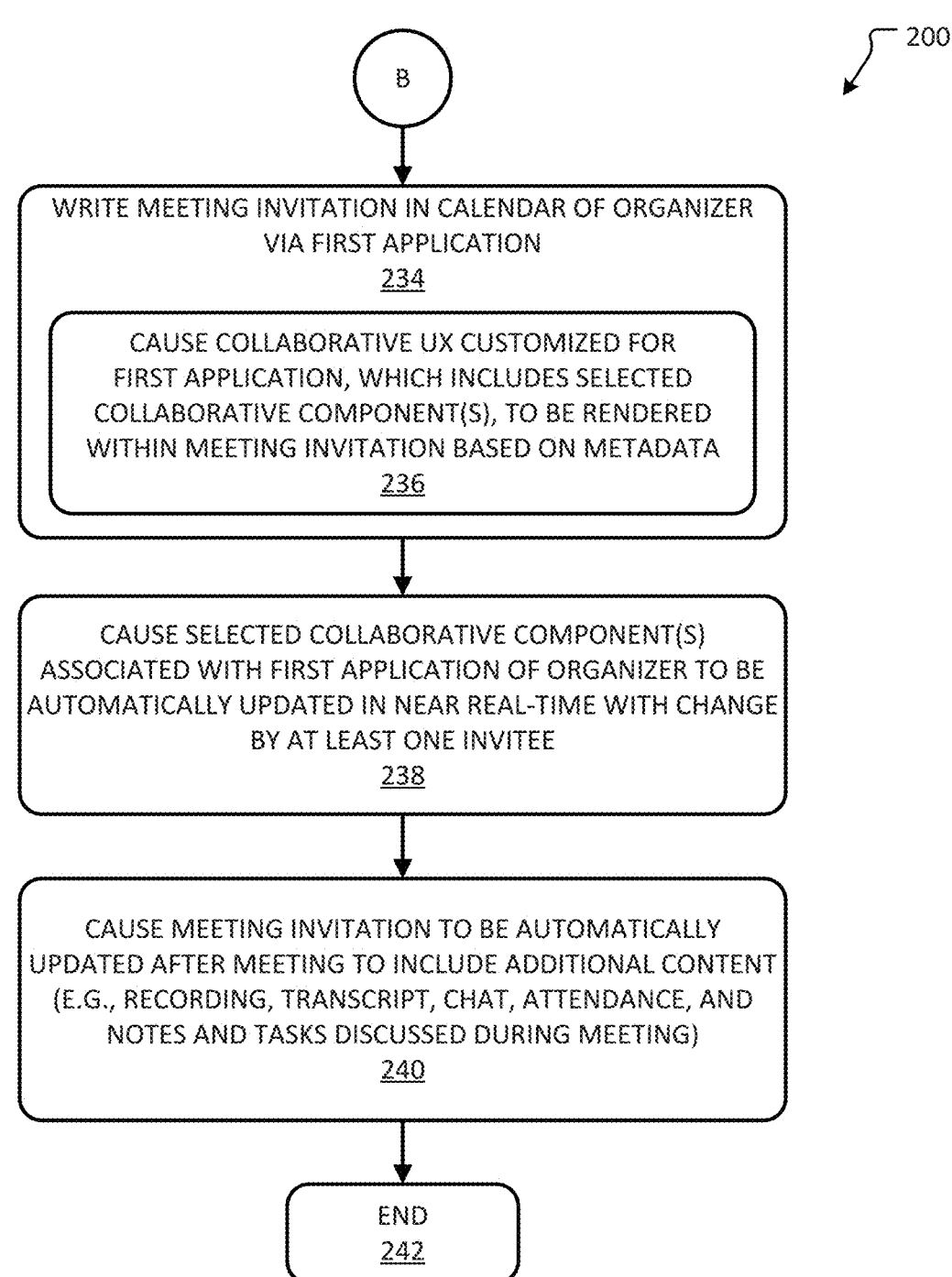

Referring now to FIGS. 2A-C, a method 200 for generating a collaboration object associated with a meeting based a meeting invitation with one or more collaborative components in accordance with examples of the present disclosure is provided. A general order for the steps of the method 200 is shown in FIGS. 2A-C. Generally, the method 200 starts at 202 and ends at 242. The method 200 may include more or fewer steps or may arrange the order of the steps differently than those shown in FIGS. 2A-C. In the illustrative aspect, the method 200 is performed by a server (e.g., a collaboration assistant server 140). However, it should be appreciated that one or more steps of the method 200 (e.g., operations 204-224) may be performed by a user's computing device (e.g., a computing device 120A of a meeting organizer 110A). For example, the collaboration assistant server 140 may be any suitable computing device that is capable of communicating with one or more computing devices 120 for generating and utilizing the collaboration object before, during, and after the meeting. For example, the computing device 120 may be, but is not limited to, a computer, a notebook, a laptop, a mobile device, a smartphone, a tablet, a portable device, or any other suitable computing device that is capable of communicating with a collaboration assistant server 140. The method 200 can be executed as a set of computer-executable instructions executed by a computer system and encoded or stored on a computer readable medium. Further, the method 200 can be performed by gates or circuits associated with a processor, Application Specific Integrated Circuit (ASIC), a field programmable gate array (FPGA), a system on chip (SOC), or other hardware device. Hereinafter, the method 200 shall be explained with reference to the systems, components, modules, software, data structures, user interfaces, etc. described in conjunction with FIG. 1 and FIGS. 10-12.

The method 200 starts at operation 202, where flow may proceed to 204. At operation 204, the collaboration assistant server 140 receives an indication from an organizer 120A to schedule a meeting using a first application. For example, the first application may be a calendar application, a messaging application, or any other application that is capable of generating a meeting invitation for a meeting and is communicatively coupled to a server (e.g., a collaboration assistant server 140) for generating a collaboration object associated with the meeting.

Once the indication to schedule a meeting is received, at operation 206, the collaboration assistant server 140 provides a meeting invitation template via the first application. For example, as indicated in 208, the meeting invitation template includes text fields for inputting meeting parameters. The meeting parameters may include a meeting title, invitees, and a collaborative platform for the meeting. As indicated in 210, the meeting invitation template further includes a description field for inputting a meeting description. Additionally, the meeting invitation template includes a tool bar for adjusting text formatting of the meeting description and/or attaching files (e.g., documents and images) to the meeting invitation, as indicated in 212. Furthermore, the meeting invitation template includes a plurality of collaborative components that are selectable by the organizer to be added to the meeting invitation, as indicated in 214. For example, the collaborative components may include agenda, meeting notes, and action items.

Subsequently, at operation 216, the collaboration assistant server 140 receives one or more meeting parameters of the meeting. For example, the meeting organizer may provide a meeting title, identities of invitees, and a collaborative platform for the meeting.

At operation 218 in FIG. 2B, the collaboration assistant server 140 receives selection of one or more collaborative components from the plurality of collaborative components. For example, the meeting organizer may select an agenda collaborative component to be added to the meeting invitation to help the invitees to prepare for the meeting and to guide them through the meeting. It should be appreciated that, in some aspects, operation 218 may be performed prior to operation 216.

At operation 220, the collaboration assistant server 140 updates the meeting invitation template to populate the one or more selected collaborative components. In some aspects, the one or more selected collaborative components may be populated in the description field.

Subsequently, at operation 222, the collaboration assistant server 140 receives content to the one or more selected collaborative components. In the example above, in response to the agenda collaborative component added to the meeting invitation template, the organizer may add one or more agenda items to the agenda. For example, the agenda items may include a list of topics, talking points, and activities to be discussed during the meeting. As described further below, once the meeting invitation is sent to the one or more invitees, the one or more invitees can also edit the agenda items in the sent meeting invitation. At operation 224, the collaboration assistant server 140 causes the meeting invitation to be sent to one or more invitees via the first application.

Once the invitation is sent, at operation 226, the collaboration assistant server 140 generates a collaboration object associated with the meeting. As described above, the collaboration object is a central platform that holds pointers to meeting content (e.g., one or more collaborative components and its content) associated with the meeting and provides appropriate meeting content for the organizer and invitees to collaborate before, during, and after the meeting.

To do so, at operation 228, the collaboration assistant server 140 parses one or more selected collaborative components from the meeting invitation and writes to the collaboration object. Additionally, at operation 230, the collaboration assistant server 140 determines one or more additional collaborative components from the plurality of collaborative components that are deemed relevant to the meeting and writes the additional collaborative components to the collaboration object. In other words, the collaboration object is updated to include the additional collaborative components. The collaboration assistant server 140 may determine the additional collaborative components based on temporal factors (e.g., during or after the meeting) and/or contextual factors (e.g., a type of application, a type of meeting, or shared contents) using, for example, one or more generative machine learning models (e.g., Large Language Model (LLM)). For example, an additional collaborative component may be deemed relevant to the meeting if the additional collaborative component is likely to be needed or useful before, during, and after the meeting. In some aspects, every collaborative component from the plurality of collaborative components may be deemed relevant to the meeting. In some aspects, the collaboration assistant server 140 may deploy artificial intelligence (AI) to determine if there are any additional collaborative components relevant to the meeting. Additionally, in some aspects, the collaboration assistant server 140 may use multiple heuristic signals. Additionally or alternatively, the collaboration assistant server 140 may determine one or more additional collaborative components using one or more generative machine learning models (e.g., LLM).

For example, when the organizer creates a new meeting invitation, the organizer may only select an agenda to be added to the meeting invitation to help the invitees to prepare for the meeting and to guide them through the meeting. However, a meeting note component is likely to be needed or useful during the meeting to provide a common place for the organizer and invitees to take, share, and/or edit notes during the meeting. In some aspects, a summary of the meeting may be automatically generated and stored in the meeting notes component. Additionally, an action item component may be useful during or after the meeting. For example, the organizer and invitees may add one or more action items (e.g., tasks and deadlines) during the meeting, which may be edited, deleted, or confirmed by the organizer or an invitee. In some aspects, action items may be automatically generated during the meeting and provided to the organizer and invitees. The organizer and invitees may confirm, edit, add, and/or delete one or more items from a list of the automatically generated action items.

Additionally or alternatively, when the organizer creates a new meeting invitation with only a meeting agenda, the collaboration assistant server 140 may determine additional collaborative components based on recent chats, emails, or documents shared between the organizer and the invitees that are on the meeting. The collaboration assistant server 140 may determine an agenda content to be added to the meeting agenda component and/or any other component contents that are relevant to the meeting. The collaboration assistant server 140 may then determine one or more collaborative components to be added to the collaboration object based on the relevant component contents.

Additionally or alternatively, the collaboration assistant server 140 may determine one or more additional collaborative components using Large Language Model (LLM) AI with a prompt. For example, the organizer may provide a prompt that includes: "assemble a list of relevant conversation topics for a meeting using the keywords I have entered in this meeting form, the recent communications between myself and those invited to this meeting, and the Loop components and documents that I have shared with the people invited to this meeting," "prioritize the unresolved topics first, and summarize the relevant decisions that have been made," and/or "craft an agenda of things for us to resolve in a 30 minute meeting, prioritized by urgency and importance, and tag the people most likely to be driving for resolution on each of the agenda topics."

Similarly, before and during the meeting, the same prompt may produce better results if recalculated based on new information from a transcript or from document updates that have been made since the meeting invite was created. After the meeting, the same prompt may again produce better results if recalculated based on the final transcript and action items established during the meeting or conversation. Additionally, if additional documents or clarification have been written after the meeting, a collaborative component may be included to summarize that content and shared for people to understand a summary of the output of the meeting or a complex answer/response to one of the questions or action items that came up during the meeting. Heuristically speaking, anything that is shared in the chat during or after the meeting could be used as a strong signal to answer one of the questions or action items being discussed at the time of the transcript or shortly after the discussion.

Additionally, as indicated in 232, the collaboration object is associated with metadata for generating one or more collaborative user experiences (UXs) for different applications. A collaborative UX may customize the portable interface and functionality of the collaborative components for a particular hosting application (e.g., the first application and/or a second application different from the first application). For example, while a first collaborative UX and a second collaborative UX may exhibit similar functionality for supporting collaborative user interactions, the first collaborative UX may be customized so as to exhibit a similar look and/or feel (e.g., theming, color scheme, layout, design elements, etc.) to a first user interface associated with the first application and a second collaborative UX may exhibit a similar look and/or feel to a second user interface associated with the second application. That is, the first collaborative UX may appear to be native to the first application and the second collaborative UX may appear to be native to the second application. In aspects, the first collaborative UX may be different from the second collaborative UX, e.g., based on different functionality, theming, color scheme, layout, design elements, and the like.

It should be appreciated that, in some aspects, the collaboration object may be generated as the meeting invitation is being sent. In other words, operation 224 and operations 226-232 may be performed simultaneously.

At operation 234, the collaboration assistant server 140 writes the meeting invitation in a calendar of the organizer via the first application. To do so, at operation 236, the collaboration assistant server 140 causes a collaborative UX customized for the first application, which includes the one or more selected collaborative components, to be rendered within the meeting invitation, based on the metadata. In aspects, interactions with other invitees and/or the one or more collaborative components via the one or more collaborative UXs may occur before, during and/or after a meeting associated with the collaboration object. Such interactions may involve concurrent editing of content of the one or more collaborative components, instant messaging (e.g., chatting) regarding the meeting and/or the content, a virtual meeting regarding content (e.g., hosted by a second application), and the like. The interactions with one or more collaborative components may be received and synchronized across the collaborative UX and collaborative UX in near real-time, for example. That is, regardless of the application used to access the collaboration object, a current state of content of the one or more collaborative components may be provided.

At operation 238, the collaboration assistant server 140 causes the one or more selected collaborative components associated with the meeting invitation of the first application to be automatically updated in near real-time with a change by at least one invitee. It should be appreciated that the change may be made via the same first application (e.g., a calendar/messaging application) or different applications. As noted above, content may be updated before, during, or after an associated meeting. In aspects, updating content may involve editing, adding, deleting, or otherwise changing the content of the one or more collaborative components. Updating content may also include concurrent editing of content before, during, or after the meeting, such as by adding to a chat thread, or editing agenda items, notes, action items, and the like. In still further aspects, individual portions of content may be shared and collaborated on. That is, the agenda may be shared in a chat thread and any updates to the agenda items by participants may be reflected not only in the chat thread, but in an agenda section of the collaboration object across collaborative UXs for each hosting application.

At operation 240, the collaboration assistant server 140 causes the meeting invitation to be automatically updated after the meeting to include additional content. For example, additional content may be associated (e.g., attached or linked) with the collaboration object, e.g., a recording of the virtual meeting, a transcript of the recording, content created during the meeting (e.g., a whiteboard session), a meeting recap, and the like. The method 200 may end at 242.

Figure 3A:
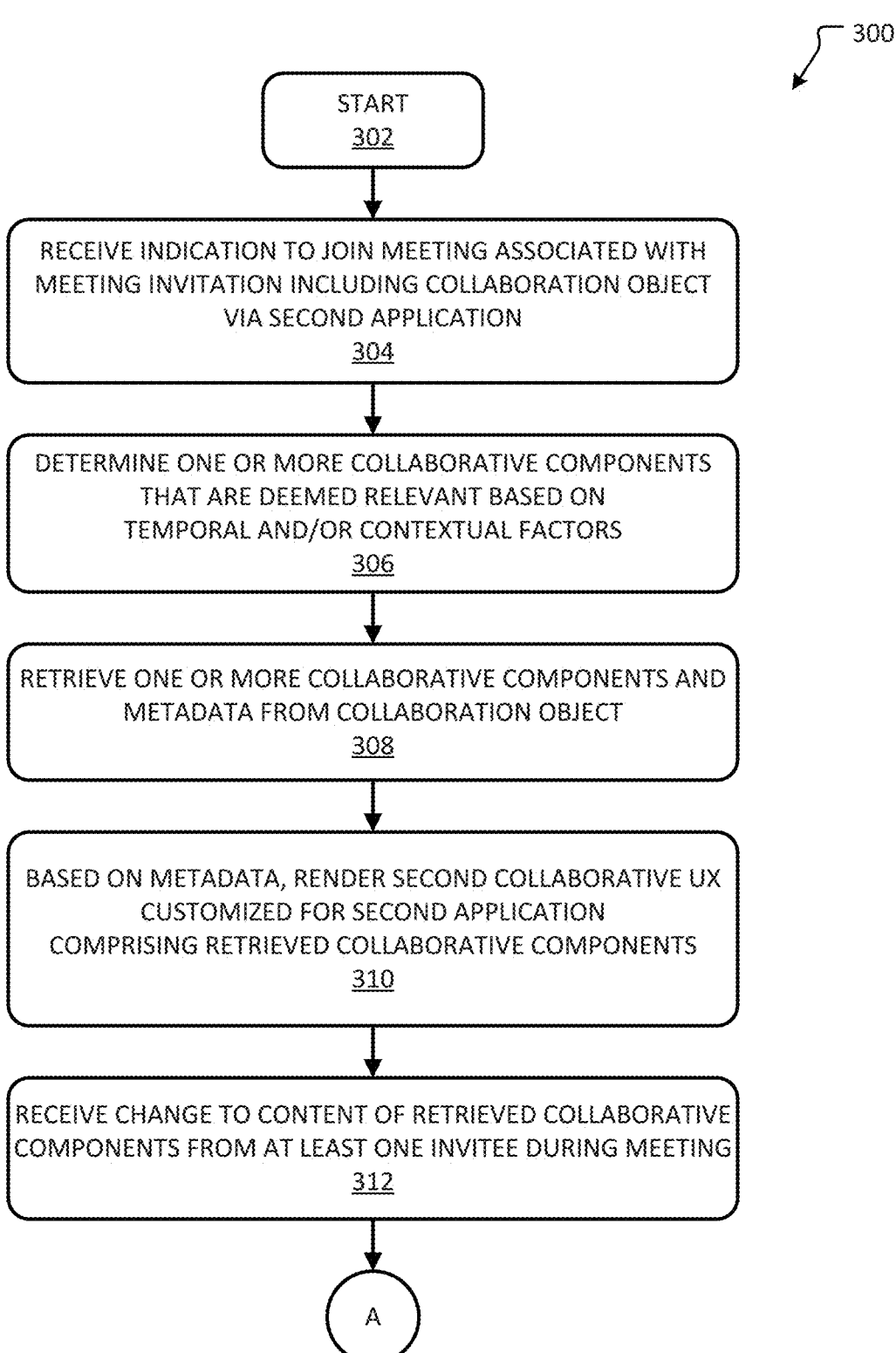
FIGS. 3A and 3B depict a flowchart of an example method of for providing one or more collaborative components from a collaboration object associated with a meeting and synchronizing updated content of the one or more collaborative components in near real-time across different devices and applications during the meeting in accordance with examples of the present disclosure.
Figure 3B:
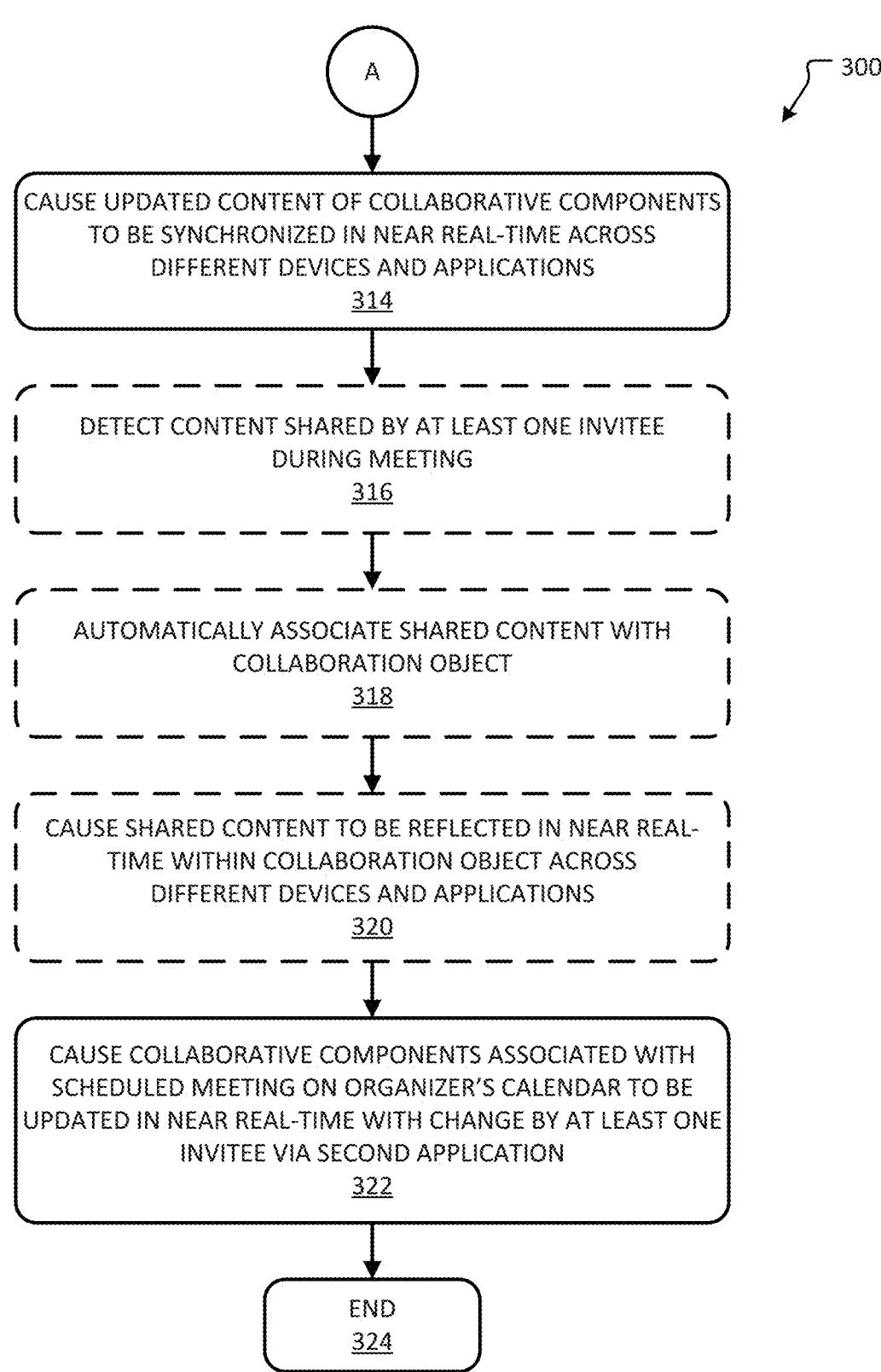

Referring now to FIGS. 3A and 3B, a method 300 for providing one or more collaborative components from a collaboration object associated with a meeting and synchronizing updated content of the one or more collaborative components in near real-time across different devices and applications during the meeting in accordance with examples of the present disclosure is provided. A general order for the steps of the method 300 is shown in FIGS. 3A and 3B. Generally, the method 300 starts at 302 and ends at 324. The method 300 may include more or fewer steps or may arrange the order of the steps differently than those shown in FIGS. 3A and 3B. In the illustrative aspect, the method 300 is performed by a server (e.g., a collaboration assistant server 140). However, it should be appreciated that one or more steps of the method 300 may be performed by a user's computing device (e.g., a computing device 120). For example, the collaboration assistant server 140 may be any suitable computing device that is capable of communicating with one or more computing devices 120 for generating and utilizing the collaboration object before, during, and after the meeting. For example, the computing device 120 may be, but is not limited to, a computer, a notebook, a laptop, a mobile device, a smartphone, a tablet, a portable device, or any other suitable computing device that is capable of communicating with a collaboration assistant server 140. The method 300 can be executed as a set of computer-executable instructions executed by a computer system and encoded or stored on a computer readable medium. Further, the method 300 can be performed by gates or circuits associated with a processor, Application Specific Integrated Circuit (ASIC), a field programmable gate array (FPGA), a system on chip (SOC), or other hardware device. Hereinafter, the method 300 shall be explained with reference to the systems, components, modules, software, data structures, user interfaces, etc. described in conjunction with FIG. 1 and FIGS. 10-12.

The method 300 starts at operation 302, where flow may proceed to 304. At operation 304, the collaboration assistant server 140 receives an indication to join a meeting associated with a meeting invitation including a collaboration object via a second application. For example, the second application may be a collaborative platform for joining the meeting associated with the meeting invitation. In other aspects, the second application may be a planner application or a notebook application for viewing and/or interacting with the collaboration object associated with the meeting. In aspects, the second application may be launched before, during, or after the meeting.

At operation 306, the collaboration assistant server 140 determines one or more collaborative components that are deemed relevant based on context. For example, one or more additional collaborative components may be determined based on temporal factors (e.g., during or after the meeting) and/or contextual factors (e.g., a type of application, a type of meeting, or shared contents) using one or more generative machine learning models (e.g., Large Language Model (LLM). It should be appreciated that an additional collaborative component may be deemed relevant to the meeting if additional collaborative components are likely to be needed or useful before, during, and after the meeting. In some aspects, every collaborative components from the plurality of collaborative components may be deemed relevant to the meeting. In some aspects, the collaboration assistant server 140 may deploy artificial intelligence (AI) to determine if there are any additional collaborative components relevant to the meeting. Additionally, in some aspects, the collaboration assistant server 140 may use multiple heuristic signals. Additionally or alternatively, the collaboration assistant server 140 may determine one or more additional collaborative components using one or more generative machine learning models (e.g., LLM).

At operation 308, the collaboration assistant server 140 retrieves the one or more collaborative components that are determined to be relevant from the collaboration object. Additionally, the collaboration assistant server 140 further retrieves metadata associated with the one or more collaborative components. For example, when a meeting invitation was created, only an agenda may have been selected to be added to the meeting invitation to help the invitees to prepare for the meeting and to guide them through the meeting. However, a meeting note component is likely be needed or useful during the meeting to provide a common place for the organizer and invitees to take, share, and/or edit notes during the meeting. Additionally, an action item component may be useful during or after the meeting. For example, the organizer and invitees may add one or more action items (e.g., tasks and deadlines) during the meeting, which may be edited, deleted, or confirmed by the organizer or an invitee. In such an example, in addition to the agenda, the collaboration assistant server 140 may retrieve the meeting note component and the action item component from the collaboration object. In other words, the retrieved collaborative components may include additional collaborative components from the one or more collaborative components initially added to the meeting invitation.

At operation 310, the collaboration assistant server 140 renders a second collaborative UX customized for the second application based on the metadata. The second collaborative UX includes the one or more retrieved collaborative components. An example of a second collaborative UX is illustrated in FIGS. 6A and 6B.

Subsequently, at operation 312, the collaboration assistant server 140 receives a change to content of the one or more retrieved collaborative components from at least one invitee during the meeting. For example, the change may include edits, additions, or deletions to content of the one or more retrieved collaborative components. For example, an invitee may add an agenda item, a note, or an action item to the retrieved collaborative components via the second collaborative UX.

In response to a change, at operation 314, the collaboration assistant server 140 causes updated content of the one or more retrieved collaborative components to be synchronized in near real-time across different devices and applications of the organizer and invitees. This allows the organizer and invitees to collaborate on the updated content associated with the meeting.

In some aspects, the collaboration assistant server 140 may detect content shared by at least one invitee during the meeting and automatically associates the shared content with the collaboration object associated with the meeting, as indicated in operations 316 and 318. For example, an invitee may attach, share, or otherwise link content with the meeting (e.g., by sharing content within a message thread). This content may automatically be associated with the collaboration object. In other aspects, the change may involve deleting content (e.g., by deleting an attachment from the meeting). Subsequently, the collaboration assistant server 140 may cause the shared content to be reflected in near real-time within the collaboration object across the different devices and applications of the organizer and invitees.

At operation 322, the collaboration assistant server 140 causes one or more collaborative components associated with the scheduled meeting on the meeting organizer's calendar to be updated in near real-time with the change by at least one invitee via the second application. That is, in response to receiving the change to content associated with the one or more retrieved collaborative components via the second collaborative UX rendered by the second application, the change may be synchronized across applications (e.g., at least the first application and the second application) and across user systems (e.g., of at least the meeting organizer and the at least one recipient) to cause the one or more collaborative components for the meeting to be updated in near real-time on the scheduled meeting on the organizer's calendar associated with the first application.

It should be appreciated that, in some aspects, the scheduled meeting on the organizer's calendar may include a different combination of collaborative components then the collaborative components added to the initial meeting invitation or the collaborative components provided in the second application during the meeting. Additionally, in some aspects, the one or more content shared during the meeting may be added to the scheduled meeting in the organizer's calendar. The method 300 may end at 324.

Figure 4:
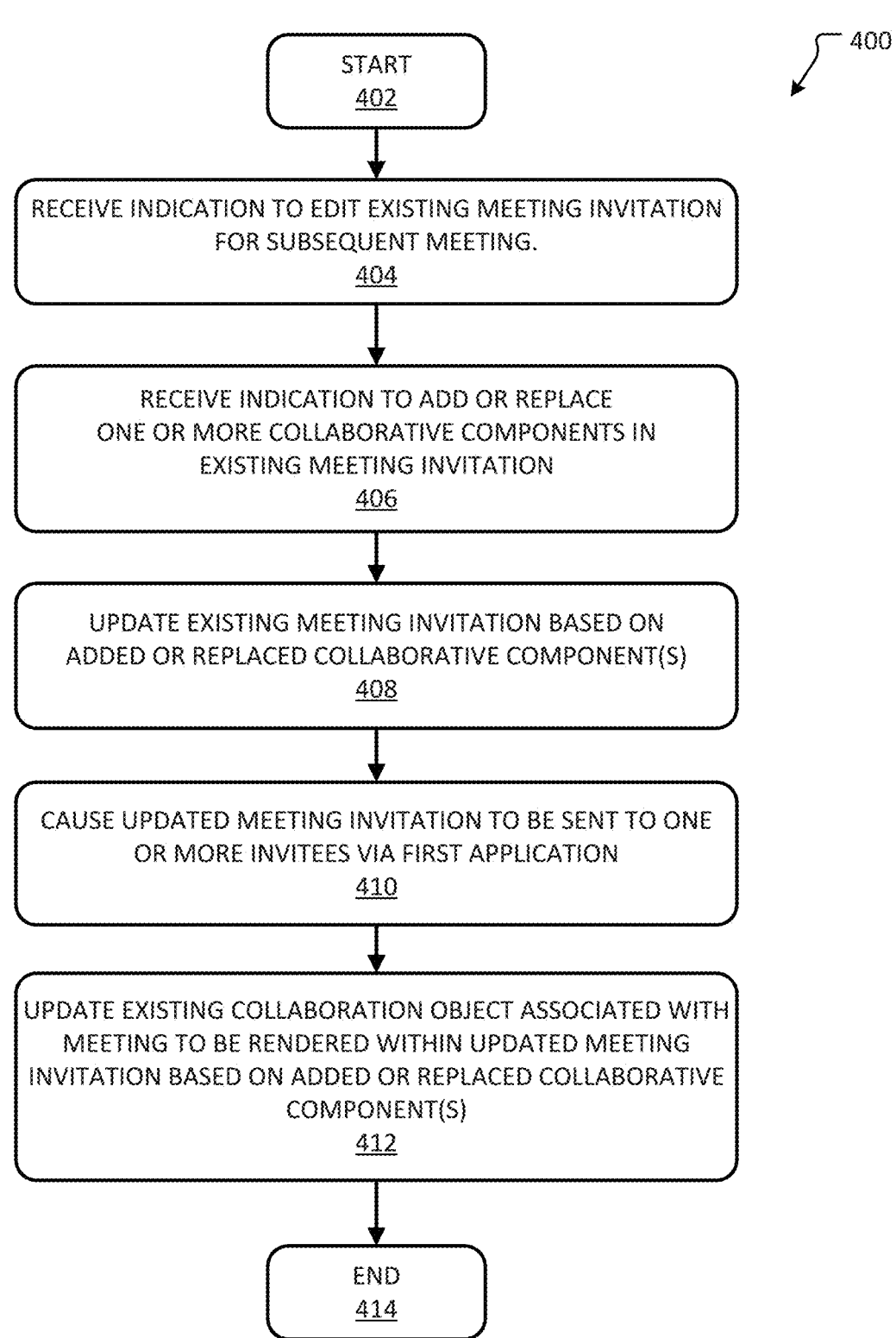
FIG. 4 depicts a flowchart of an example method of updating an existing meeting invitation for a subsequent meeting in accordance with examples of the present disclosure.

Referring now to FIG. 4, a method 400 for updating an existing meeting invitation for a subsequent meeting in accordance with examples of the present disclosure is provided. A general order for the steps of the method 400 is shown in FIG. 4. Generally, the method 400 starts at 402 and ends at 414. The method 400 may include more or fewer steps or may arrange the order of the steps differently than those shown in FIG. 4. In the illustrative aspect, the method 400 is performed by a server (e.g., a collaboration assistant server 140). However, it should be appreciated that one or more steps of the method 400 may be performed by a user's computing device (e.g., a computing device 120). For example, the collaboration assistant server 140 may be any suitable computing device that is capable of communicating with one or more computing devices 120 for generating and utilizing the collaboration object before, during, and after the meeting. For example, the computing device 120 may be, but is not limited to, a computer, a notebook, a laptop, a mobile device, a smartphone, a tablet, a portable device, or any other suitable computing device that is capable of communicating with a collaboration assistant server 140. The method 400 can be executed as a set of computer-executable instructions executed by a computer system and encoded or stored on a computer readable medium. Further, the method 400 can be performed by gates or circuits associated with a processor, Application Specific Integrated Circuit (ASIC), a field programmable gate array (FPGA), a system on chip (SOC), or other hardware device. Hereinafter, the method 400 shall be explained with reference to the systems, components, modules, software, data structures, user interfaces, etc. described in conjunction with FIG. 1 and FIGS. 10-12.

The method 400 starts at operation 402, where flow may proceed to 404. At operation 404, the collaboration assistant server 140 receives an indication to edit an existing meeting invitation for a subsequent or recurring meeting. For example, after a first meeting, a meeting organizer may edit or update the existing meeting invitation for the following meeting. The existing meeting invitation may be created as recurring meetings.

Figure 8B:
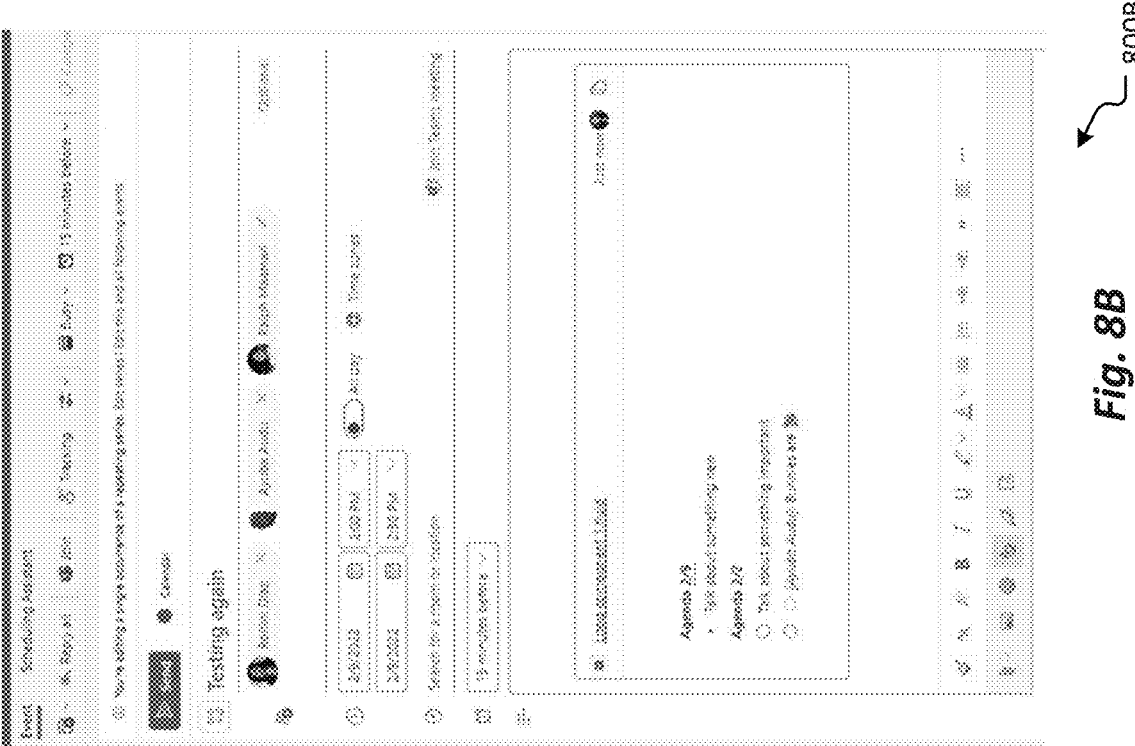
FIGS. 8A-C depict user interfaces of an application for enabling users to edit an original meeting invitation to update or add one or more collaborative components after a meeting in accordance with examples of the present disclosure.
Figure 8A:
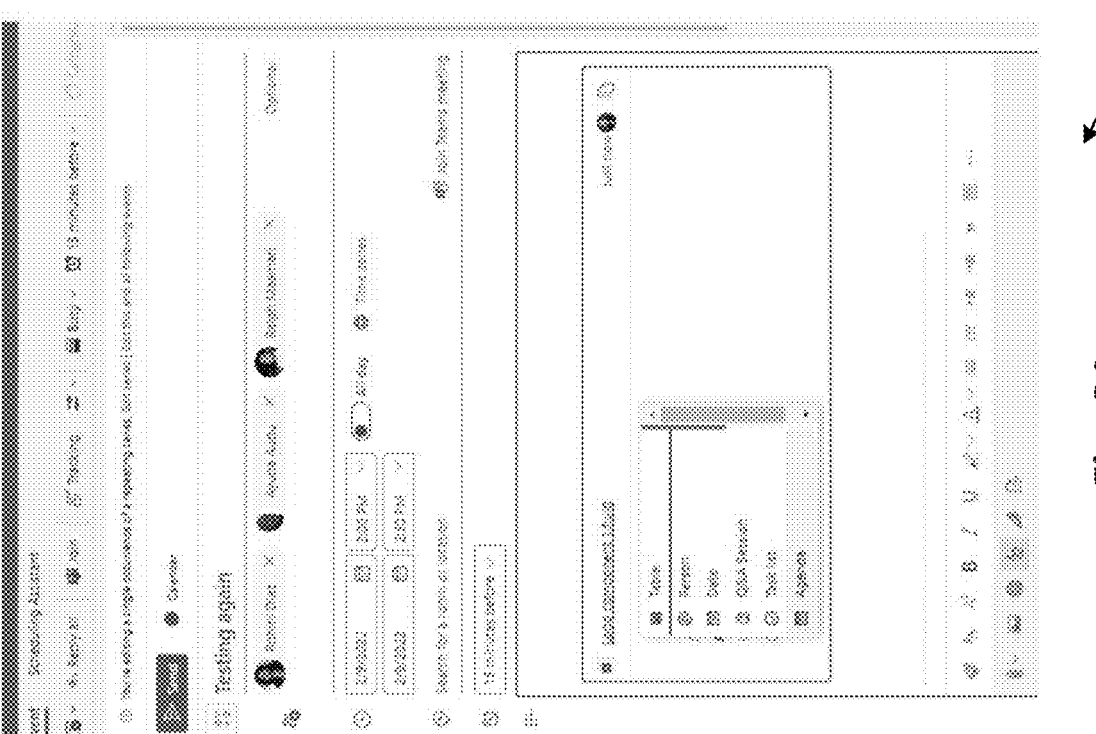
Figure 8C:
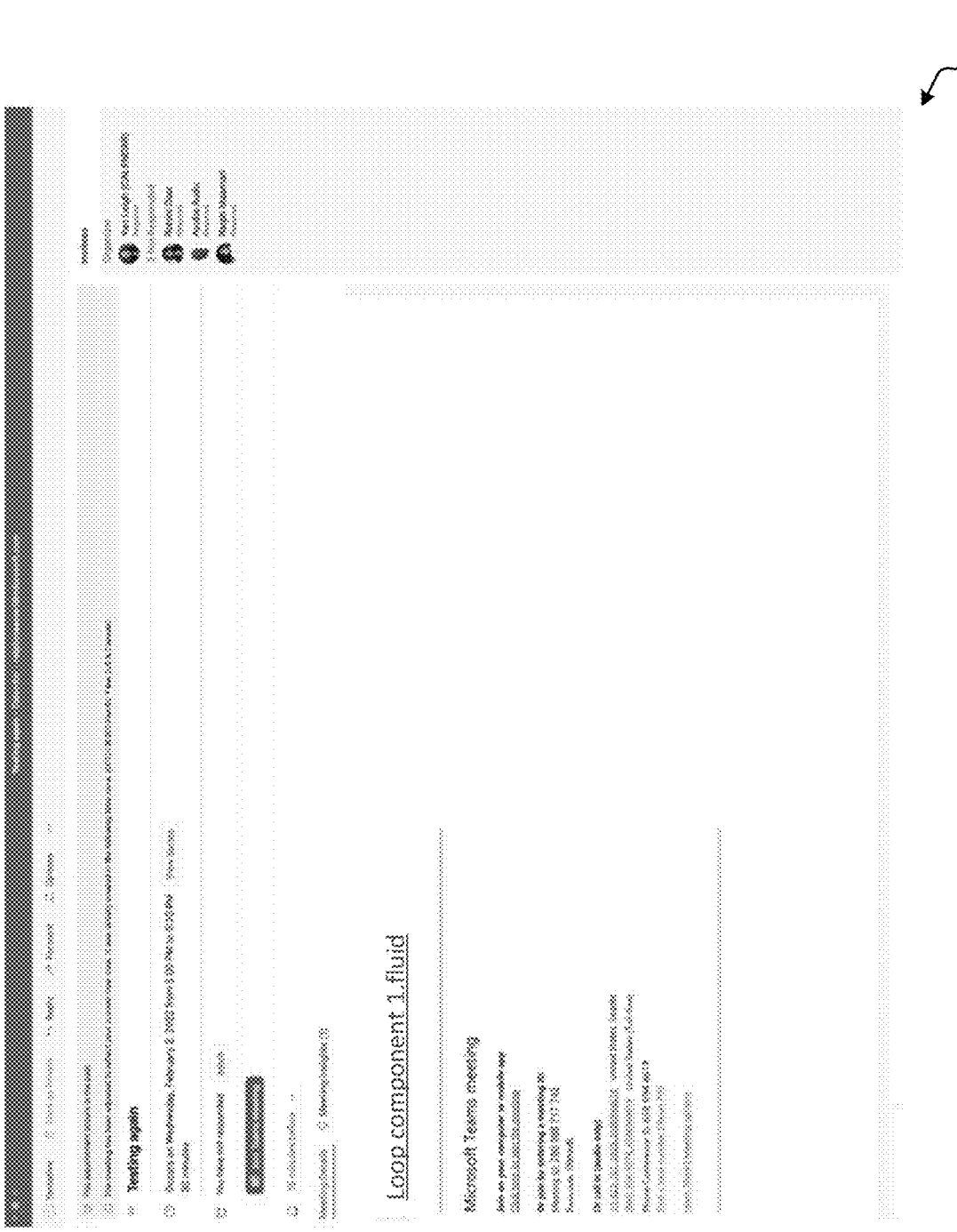

At operation 406, the collaboration assistant server 140 receives an indication to add one or more additional collaborative components to the meeting invitation or replace one or more existing collaborative components in the meeting invitation. For example, if the existing meeting invitation includes an agenda collaborative component, the organizer may add a new agenda collaborative component for the following meeting on top of the existing agenda, as shown in FIGS. 8A-C. Alternatively, the organizer may replace the existing agenda with a new agenda for the following meeting, as illustrated in FIGS. 9A-D.

Subsequently, the collaboration assistant server 140 updates the existing meeting invitation based on the added or replaced collaborative component(s) and causes the updated meeting invitation to be sent to one or more invitees via the first application, as indicated in operations 408 and 410.

At operation 412, the collaboration assistant server 140 updates an existing collaboration object associated with the meeting to be rendered within the updated meeting invitation based on the added or replaced collaborative component (s). The method 400 may end at 414.

Figure 5B:
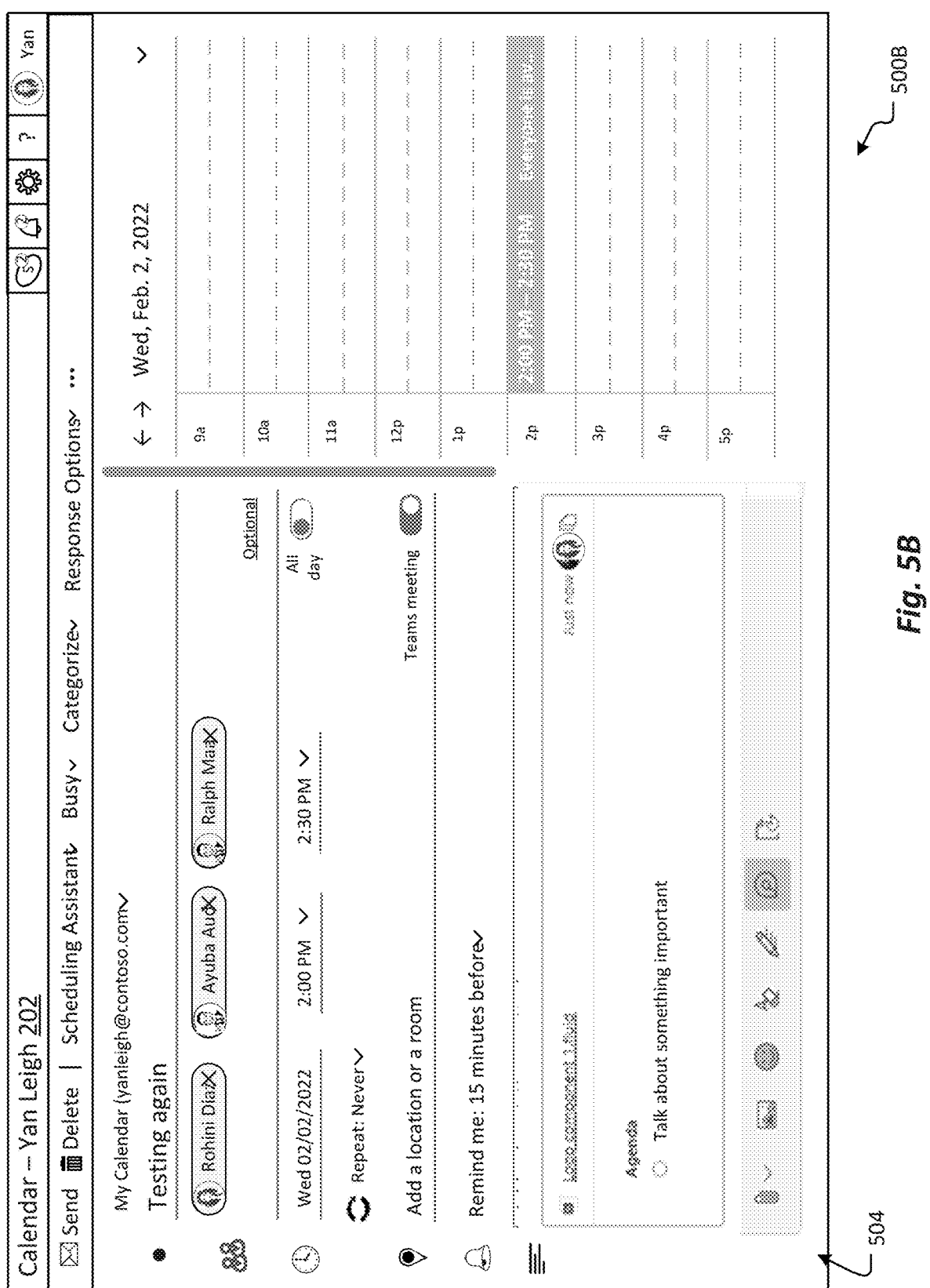

FIGS. 5A and 5B depict a user interface of a calendar/messaging application for generating a collaboration object, in accordance with examples of the present disclosure.

FIG. 5A depicts a user interface 500A of a calendar/messaging application for receiving an indication to compose a meeting invitation. The user interface 500A of the calendar/messaging application depicts a calendar interface associated with a first user 502 (e.g., Yan Leigh). As illustrated, first user 502 is composing a meeting invitation based on meeting invitation template 504. The meeting invitation template 504 comprises one or more input fields and/or selections for receiving parameters associated with a proposed meeting. For instance, the meeting invitation template 504 may comprise a title field, an attendee field, a time/date field, a location field, a reminder selection, a collaborative platform selection, and a meeting repeat selection, and the like.

The meeting invitation template 504 may further comprise a description field 506 for inputting a meeting description and tool bar 508 having controls for attaching documents and/or images, adjusting text formatting, and the like. The tool bar 508 further includes controls for adding one or more collaborative components (e.g., agenda, notes, action items), which are configured with fields for receiving content items (e.g., specific agenda items, notes, action items) associated with the proposed meeting.

FIG. 5B depicts a user interface 500B of a calendar/messaging application for receiving parameters in a meeting invitation template and content in an agenda collaborative component, in accordance with examples of the present disclosure.

Similar to FIG. 5A, FIG. 5B illustrates user interface 500B of a calendar/messaging application. As illustrated, the first user 202 has entered parameters into meeting invitation template 504. For instance, first user 202 has input a meeting title ("Testing again") for the proposed meeting and has input invitees, including Rohini Diaz, Ayuba Audu, and Ralph Maamari. A collaborative platform for a virtual meeting has been selected (e.g., "Teams meeting") and date/time ("Wed 02/02/2022" from "2:00 PM to 2:30 PM") has been entered. Additionally, the first user 202 has added a content item (e.g., "Talk about something important") to the agenda collaborative component.

Figure 6:
FIG. 6 depicts an exemplary user interface of a collaboration application that provide a collaboration object for enabling users to collaborate during a meeting in accordance with examples of the present disclosure.

FIG. 6 depicts an example of a user interface of a collaboration application that provides a collaboration object for enabling users to collaborate during a meeting, in accordance with examples of the present disclosure. As shown, attendees of the meeting are displayed in a main pane and collaborative components 610 are provided in a side pane of user interface 600 via a collaborative UX, which is customized for the collaborative platform, as described above, one or more relevant collaborative components are determined based on the temporal factors (e.g., during or after the meeting) and/or contextual factors (e.g., a type of application, a type of meeting, or shared contents) and retrieved from the collaboration object associated with the meeting. In this example, the agenda, notes, and action items collaborative components have been retrieved and added to the collaborative UX. For instance, the layout and background of collaborative UX are customized according to a theme and/or color scheme of the collaborative platform.

Figure 7:
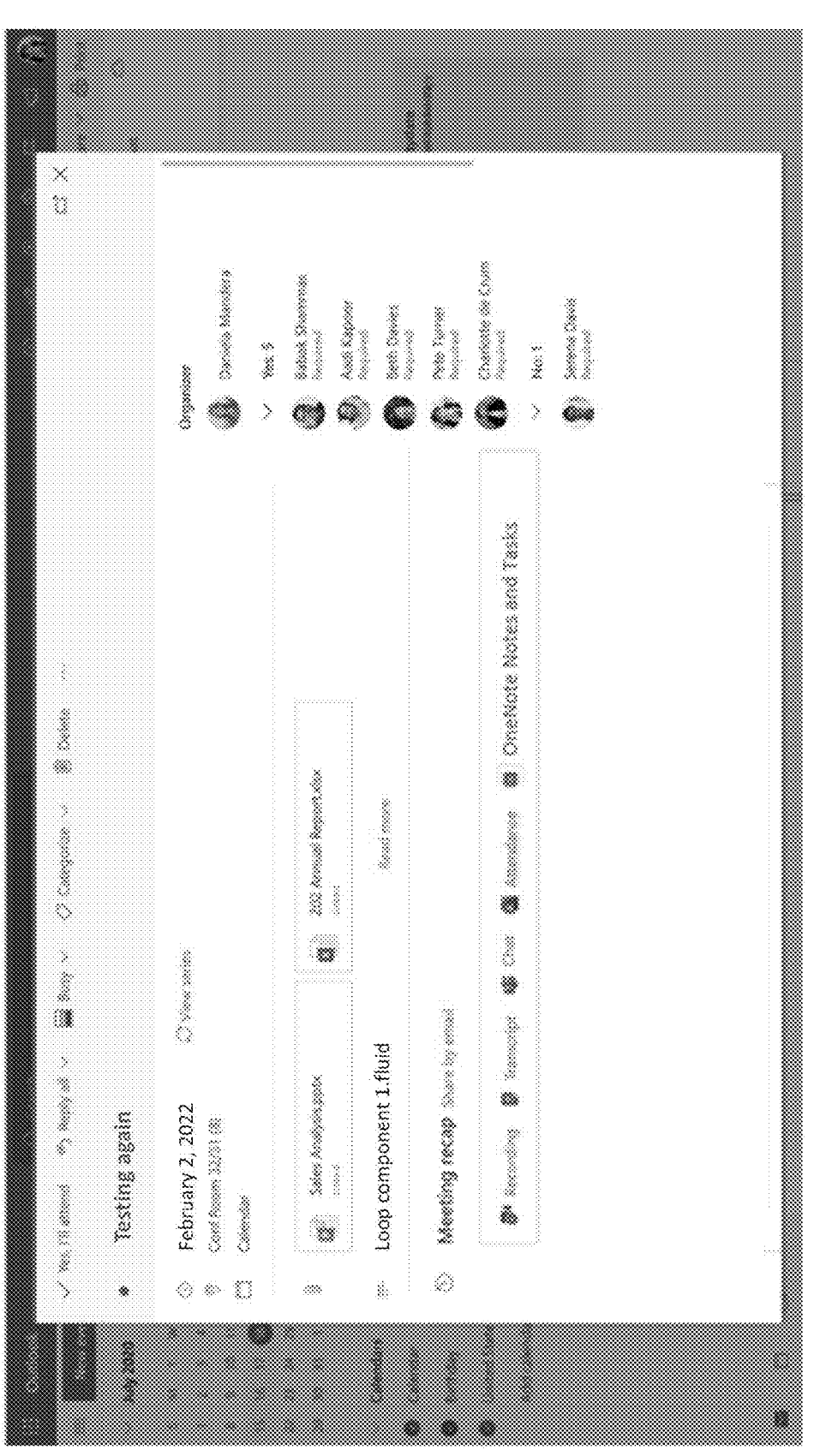
FIG. 7 depicts an exemplary user interface of a calendar/messaging application that provide a meeting summary after a meeting in accordance with examples of the present disclosure.

FIG. 7 depicts a user interface 700 of a calendar/messaging application that provide a meeting recap for enabling users to collaborate after a meeting, in accordance with examples of the present disclosure. The meeting recap includes a collaboration object (e.g., Loop component 1.fluid) associated with the meeting and additional content received during the meeting. For example, additional content may be associated (e.g., attached or linked) with the collaboration object, e.g., a recording of the virtual meeting, a transcript of the recording, content created during the meeting (e.g., a whiteboard session), a meeting recap, and the like.

FIGS. 8A-C depict a user interface 800A-C of a calendar/messaging application for adding an additional collaborative component to an existing meeting invitation for a subsequent meeting. As shown in FIGS. 8A and 8B, a meeting organizer may select a new agenda for the subsequent meeting (e.g., a meeting to be held on Feb. 9, 2022) to be added to the existing meeting invitation with an existing agenda for a meeting that had already occurred (e.g., a meeting occurred on Feb. 2, 2022). FIG. 8C depict a user interface 800C of a calendar/messaging application for sending an updated meeting invitation with the update collaboration object (e.g., Loop component 1.fluid) to the one or more invitees.

Figure 9B:
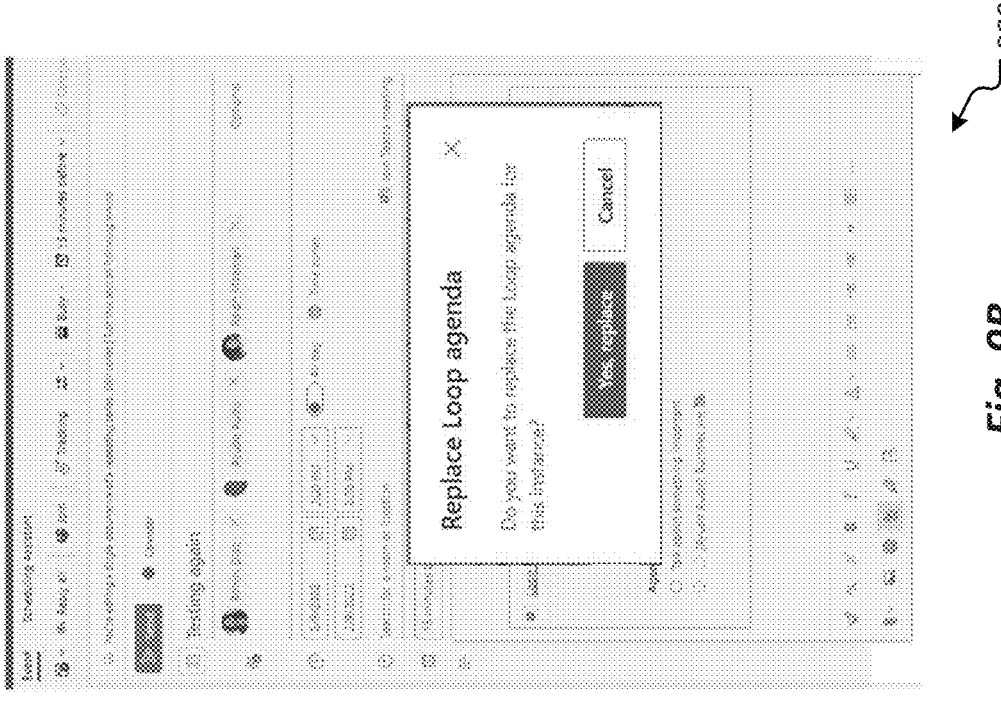
FIGS. 9A-D depict user interfaces of an application for enabling users to edit an original meeting invitation to replace one or more collaborative components after a meeting in accordance with examples of the present disclosure.
Figure 9A:
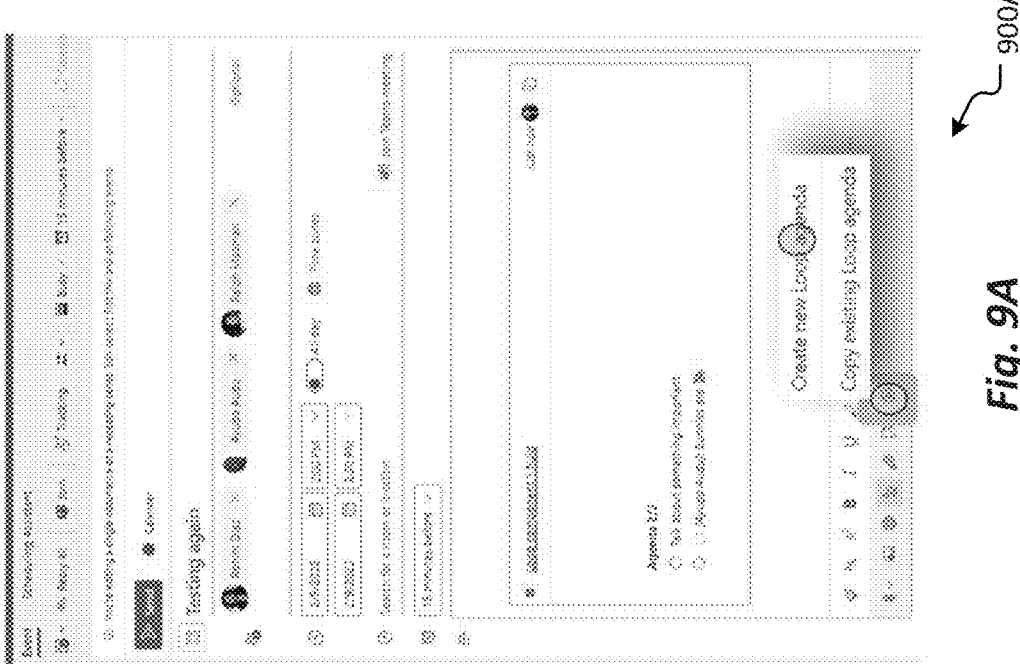
Figure 9D:
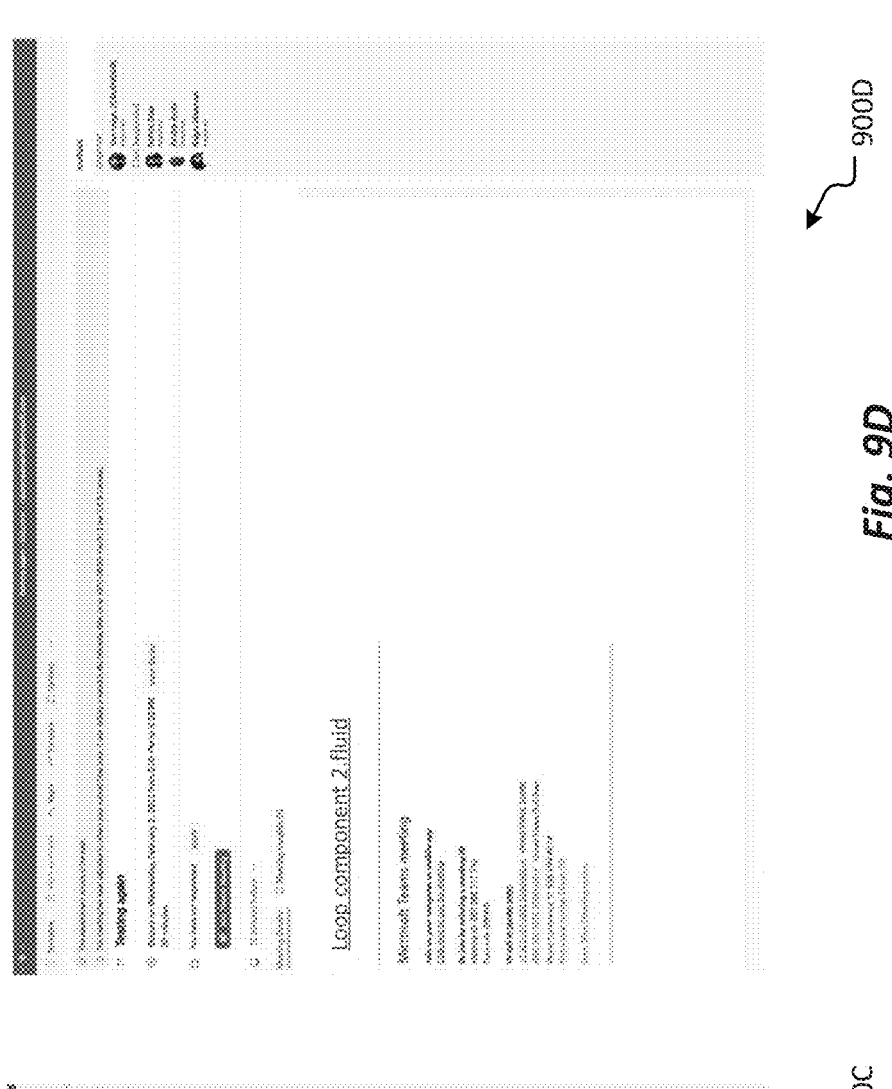
Figure 9C:
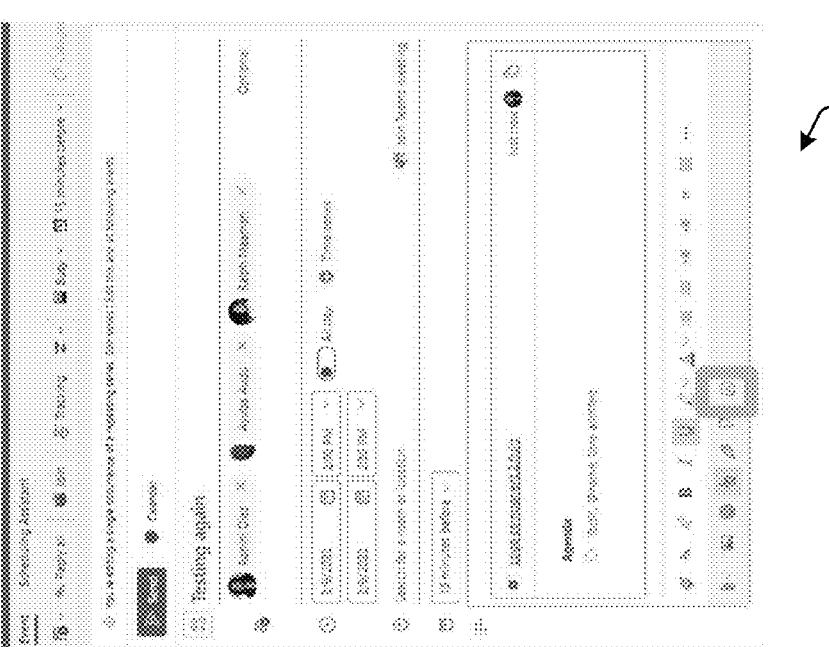

FIGS. 9A-D depict a user interface 900A-D of a calendar/messaging application for replacing an existing collaborative component with a new collaborative component in an existing meeting invitation for a subsequent meeting. As shown in FIG. 9A, a meeting organizer may select a new agenda for the subsequent meeting (e.g., a meeting to be held on Feb. 9, 2022). FIG. 9B depicts a user interface 900B of a calendar/messaging application for providing an option for replacing the existing agenda (e.g., for a meeting Feb. 2, 2022). When the organizer chooses to replace it, a user interface 900C is provided for providing a new agenda for a subsequent meeting to be held on Feb. 9, 2022. FIG. 9D depict a user interface 800D of a calendar/messaging application for sending an updated meeting invitation with a new collaboration object (e.g., Loop component 2.fluid) to the one or more invitees.

Figure 10:
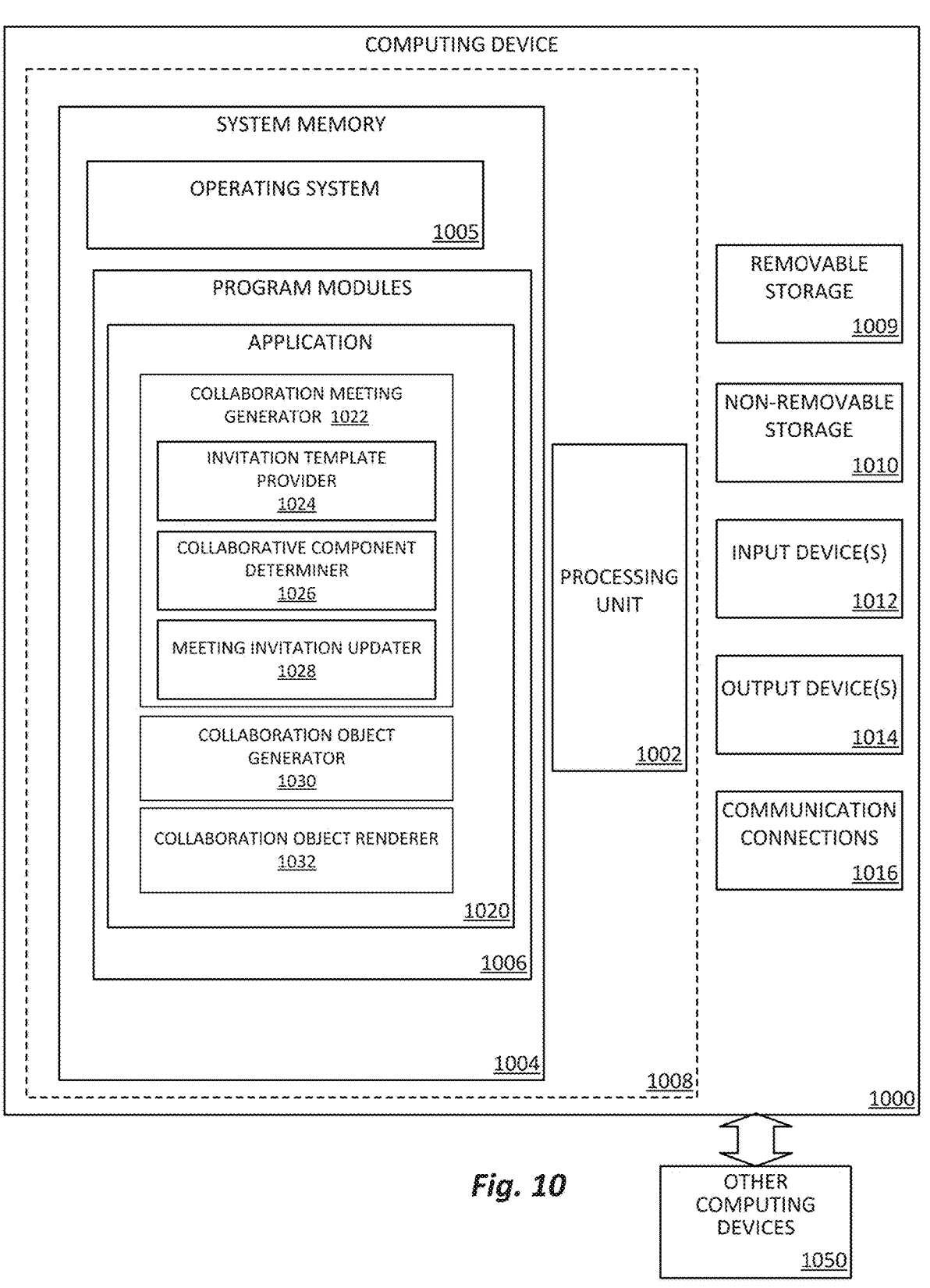
FIG. 10 is a block diagram illustrating example physical components of a computing device with which aspects of the disclosure may be practiced.
Figure 11:
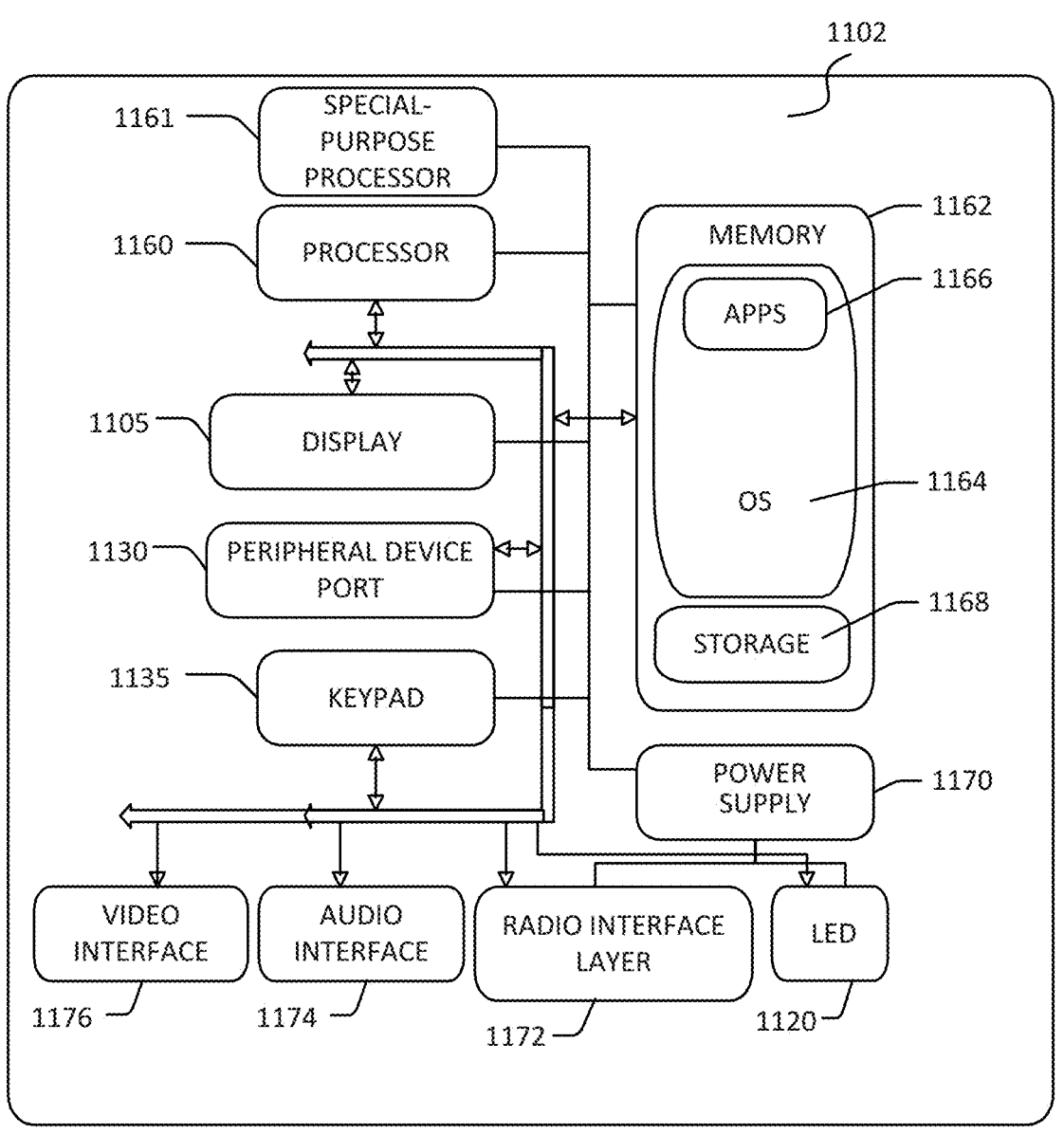
FIG. 11 is a simplified block diagram of a computing device with which aspects of the present disclosure may be practiced.
Figure 12:
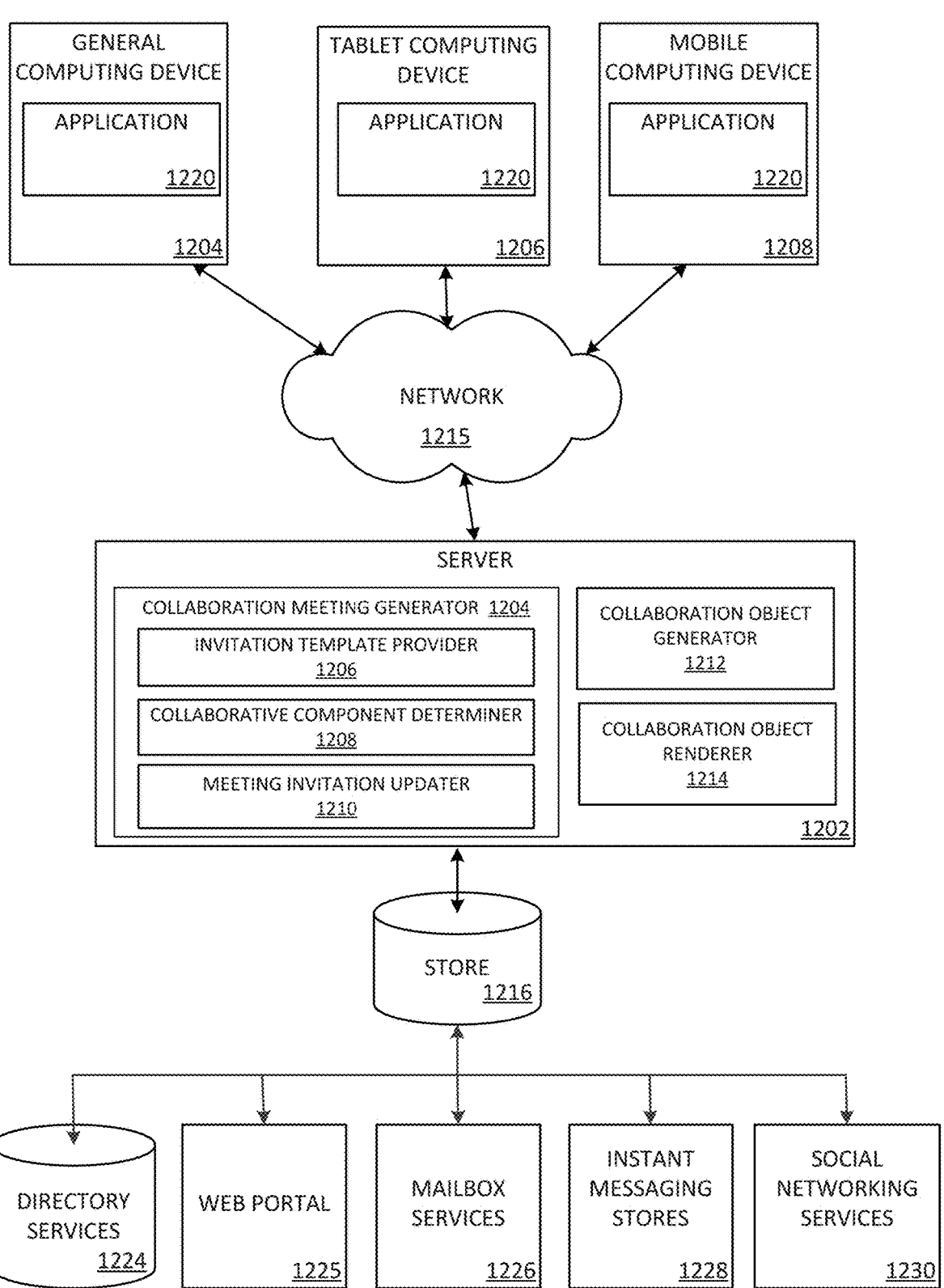
FIG. 12 is a simplified block diagram of a distributed computing system in which aspects of the present disclosure may be practiced.

FIGS. 10-12 and the associated descriptions provide a discussion of a variety of operating environments in which aspects of the disclosure may be practiced. However, the devices and systems illustrated and discussed with respect to FIGS. 10-12 are for purposes of example and illustration and are not limiting of a vast number of computing device configurations that may be utilized for practicing aspects of the disclosure, described herein.

FIG. 10 is a block diagram illustrating physical components (e.g., hardware) of a computing device 1000 with which aspects of the disclosure may be practiced. The computing device components described below may have computer executable instructions for implementing one or more collaboration applications 1020 on a computing device, including computer executable instructions for the one or more collaboration applications 1020 that can be executed to employ the methods disclosed herein. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories.

The system memory 1004 may include an operating system 1005 and one or more program modules 1006 suitable for running the one or more collaboration applications 1020, such as a collaboration meeting generator 1004, an invitation template provider 1006, a collaborative component determiner 1008, a meeting invitation updater 1010, a collaboration object generator 1012, or a collaboration object renderer 1014. The operating system 1005, for example, may be suitable for controlling the operation of the computing device 1000.

Furthermore, aspects of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., application 1020) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 11 illustrates a system 1100 that may, for example, be a mobile computing device, such as a mobile telephone, a smart phone, wearable computer (such as a smart watch), a tablet computer, a laptop computer, and the like, with which aspects of the disclosure may be practiced. In one example, the system 1100 is implemented as a "smart phone" capable of running one or more applications (e.g., browser, e-mail, calendaring, contact managers, messaging clients, games, and media clients/players). In some aspects, the system 1100 is integrated as a computing device, such as an integrated personal digital assistant (PDA) and wireless phone.

In a basic configuration, such a mobile computing device is a handheld computer having both input elements and output elements. The system 1100 typically includes a display 1105 and one or more input buttons that allow the user to enter information into the system 1100. The display 1105 may also function as an input device (e.g., a touch screen display).

If included, an optional side input element allows further user input. For example, the side input element may be a rotary switch, a button, or any other type of manual input element. In alternative aspects, system 1100 may incorporate more or less input elements. For example, the display 1105 may not be a touch screen in some aspects. In another example, an optional keypad 1135 may also be included, which may be a physical keypad or a "soft" keypad generated on the touch screen display.

In various aspects, the output elements include the display 1105 for showing a graphical user interface (GUI), a visual indicator (e.g., a light emitting diode 1120), and/or an audio transducer 1125 (e.g., a speaker). In some aspects, a vibration transducer is included for providing the user with tactile feedback. In yet another aspect, input and/or output ports are included, such as an audio input (e.g., a microphone jack), an audio output (e.g., a headphone jack), and a video output (e.g., a HDMI port) for sending signals to or receiving signals from an external device.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1100 also includes a non-volatile storage area 1168 within the memory 1162. The non-volatile storage area 1168 may be used to store persistent information that should not be lost if the system 1100 is powered down. The application programs 1166 may use and store information in the non-volatile storage area 1168, such as e-mail or other messages used by an e-mail application, and the like. A synchronization application (not shown) also resides on the system 1100 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the system 1100 described herein (e.g., a collaboration meeting generator, a collaboration object generator, and a collaboration object renderer, etc.).

The system 1100 has a power supply 1170, which may be implemented as one or more batteries. The power supply 1170 might further include an external power source, such as an AC adapter or a powered docking cradle that supplements or recharges the batteries.

The system 1100 may also include a radio interface layer 1172 that performs the function of transmitting and receiving radio frequency communications. The radio interface layer 1172 facilitates wireless connectivity between the system 1100 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated example, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with aspects of the present disclosure, the microphone may also serve as an audio sensor to facilitate control of notifications, as will be described below. The system 1100 may further include a video interface 1176 that enables an operation of an onboard camera 1130 to record still images, video stream, and the like.

It will be appreciated that system 1100 may have additional features or functionality. For example, system 1100 may also include additional data storage devices (removable and/or non-removable) such as, magnetic disks, optical disks, or tape. Such additional storage is illustrated in FIG. 11 by the non-volatile storage area 1168.

Data/information generated or captured and stored via the system 1100 may be stored locally, as described above, or the data may be stored on any number of storage media that may be accessed by the device via the radio interface layer 1172 or via a wired connection between the system 1100 and a separate computing device associated with the system 1100, for example, a server computer in a distributed computing network, such as the Internet. As should be appreciated, such data/information may be accessed via the radio interface layer 1172 or via a distributed computing network. Similarly, such data/information may be readily transferred between computing devices for storage and use according to any of a variety of data/information transfer and storage means, including electronic mail and collaborative data/information sharing systems.

FIG. 12 illustrates one aspect of the architecture of a system for processing data received at a computing system from a remote source, such as a personal computer 1204, tablet computing device 1206, or mobile computing device 1208, as described above. Content displayed at server device 1202 may be stored in different communication channels or other storage types. For example, various documents may be stored using a directory service 1224, a web portal 1225, a mailbox service 1226, an instant messaging store 1228, or a social networking site 1230.

An application 1220 (e.g., similar to the application 1020) may be employed by a client that communicates with server device 1202. Additionally, or alternatively, a collaboration meeting generator 1204, an invitation template provider 1206, a collaborative component determiner 1208, a meeting invitation updater 1210, a collaboration object generator 1212, and/or a collaboration object renderer 1214 may be employed by server device 1202. The server device 1202 may provide data to and from a client computing device such as a personal computer 1204, a tablet computing device 1206 and/or a mobile computing device 1208 (e.g., a smart phone) through a network 1215. By way of example, the computer system described above may be embodied in a personal computer 1204, a tablet computing device 1206 and/or a mobile computing device 1208 (e.g., a smart phone). Any of these examples of the computing devices may obtain content from the store 1216, in addition to receiving graphical data useable to be either pre-processed at a graphic-originating system, or post-processed at a receiving computing system.

It will be appreciated that the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the disclosure may be practiced include, keystroke entry, touch screen entry, voice or other audio entry, gesture entry where an associated computing device is equipped with detection (e.g., camera) functionality for capturing and inter-preting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concur-rently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this applica-tion are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more com-puting devices. For example, user interfaces and information of various types may be displayed and interacted with on a wall surface onto which user interfaces and information of various types are projected. Interaction with the multitude of computing systems with which aspects of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunc-tive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses mate-rial or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The example systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the example aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the opera-tion of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Example hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

In accordance with at least one example of the present disclosure, a method for generating a collaboration object is provided. The method may include detecting an intent to generate a meeting invitation for a meeting by a meeting organizer via a first application, providing a meeting invitation template including one or more collaborative components, and receiving a first set of collaborative components. The first set of collaborative components includes one or more collaborative components selected from a plurality of collaborative components, and each collaborative component provides functionality for concurrent multi-user interaction. The method may further include causing the meeting invitation to be sent to at least one invitee via the first application, in response to causing the meeting invitation to be sent to at least one invitee, generating the collaboration object associated with the meeting based on the first set of collaborative components, determining one or more additional collaborative components from the plurality of collaborative components that are relevant to the meeting, and updating the collaboration object to include the one or more additional collaborative components.

In accordance with at least one aspect of the above method, the method may further include updating the meeting invitation template to populate the first set of collaborative components for receiving content.

In accordance with at least one aspect of the above method, the method may include where the collaboration object comprises pointers to the first set of collaborative components, and the additional collaborative components, and content associated with the meeting.

In accordance with at least one aspect of the above method, the method may include where the determining one or more additional collaborative components from the plurality of collaborative components that are relevant to the meeting includes determining one or more additional collaborative components from the plurality of collaborative components that are relevant to the meeting based on temporal factors and/or contextual factors using a generative machine learning model.

In accordance with at least one aspect of the above method, the method may include where the temporal factors include whether the determination of the one or more additional collaborative components are being made before, during, or after the meeting, and the contextual factors include a type of application or a type of the meeting.

In accordance with at least one aspect of the above method, the method may include where the determining one or more additional collaborative components from the plurality of collaborative components that are relevant to the meeting includes determining one or more additional collaborative components from the plurality of collaborative components that are relevant to the meeting using a heuristic technique.

In accordance with at least one aspect of the above method, the method may include where determining one or more additional collaborative components from the plurality of collaborative components that are relevant to the meeting using a generative machine learning model includes determining one or more contents that have been shared between the meeting organizer and the at least one invitee that are relevant to the meeting, and determining the one or more additional collaborative components from the plurality of collaborative components that are relevant to the meeting based on the one or more contents.

In accordance with at least one aspect of the above method, the method may further include receiving an indication to join the meeting via a second application, determining a second set of collaborative components that are deemed relevant based on temporal factors and/or contextual factors, retrieving the second set of collaborative components and metadata from the collaboration object, rendering a collaborative user experience (UX) comprising the second set of collaborative components based on the metadata via the second application, wherein the temporal factors include whether the determination of the second set of collaborative components to be retrieved are being made before, during, or after the meeting, and the contextual factors include a type of application or a type of the meeting.

In accordance with at least one aspect of the above method, the method may include where the second set of collaborative components including one or more collaborative components included in the collaboration object associated with the meeting.

In accordance with at least one aspect of the above method, the method may further include receiving user input to the second set of collaborative components by a first participant at a first user device, automatically causing the user input to the second set of collaborative components to be reflected in near real-time at a second user device associated with a second participant, persisting the collaboration object to enable concurrent multi-user interaction with the second set of collaborative components after the collaboration.

In accordance with at least one aspect of the above method, the method may further include detecting content shared by a second participant during the collaboration, and automatically causing the shared content to be associated with the collaboration object.

In accordance with at least one example of the present disclosure, a computing device for generating a collaboration object is provided. The computing device may include a processor and a memory having a plurality of instructions stored thereon that, when executed by the processor, causes the computing device to detect an intent to generate a meeting invitation for a meeting by a meeting organizer via a first application, provide a meeting invitation template including one or more collaborative components, receive a first set of collaborative components, the first set of collaborative components including one or more collaborative components selected from a plurality of collaborative components, each collaborative component providing functionality for concurrent multi-user interaction, cause the meeting invitation to be sent to at least one invitee via the first application, in response to the meeting invitation being sent to at least one invitee, generate the collaboration object associated with the meeting based on the first set of collaborative components, determine one or more additional collaborative components from the plurality of collaborative components that are relevant to the meeting using a generative machine learning model, and update the collaboration object to include the one or more additional collaborative components.

In accordance with at least one aspect of the above computing device, the computing device may comprise where the collaboration object comprises pointers to the first set of collaborative components, additional collaborative components, and its content associated with the meeting.

In accordance with at least one aspect of the above computing device, the computing device may comprise where to determine the one or more additional collaborative components from the plurality of collaborative components that are relevant to the meeting using the generative machine learning model includes to determine one or more contents that have been shared between the meeting organizer and the at least one invitee that are relevant to the meeting, and determine the one or more additional collaborative components from the plurality of collaborative components based on the one or more contents.

In accordance with at least one aspect of the above computing device, the computing device may comprise where to determine the one or more additional collaborative components from the plurality of collaborative components that are relevant to the meeting using the generative machine learning model includes to determine one or more additional collaborative components that are relevant to the meeting based on temporal factors and/or contextual factors using a generative machine learning model using the generative machine learning model, wherein the temporal factors include whether the determination of the one or more additional collaborative components are being made before, during, or after the meeting, and the contextual factors include a type of application, a type of the meeting, or shared contents between the meeting organizer and the at least one invitee.

In accordance with at least one aspect of the above computing device, the computing device may comprise instructions stored thereon that, when executed by the processor, causes the computing device to receive an indication to join the meeting via a second application, determine a second set of collaborative components that are deemed relevant based on temporal factors and/or contextual factors, retrieve the second set of collaborative components and metadata from the collaboration object, and render a collaborative user experience (UX) comprising the second set of collaborative components based on the metadata via the second application, wherein the temporal factors include whether the determination of the second set of collaborative components to be retrieved are being made before, during, or after the meeting, and the contextual factors include a type of application or a type of the meeting.

In accordance with at least one aspect of the above computing device, the computing device may comprise instructions stored thereon that, when executed by the processor, causes the computing device to detect content shared by a second participant during the collaboration, and automatically cause the shared content to be associated with the collaboration object.

In accordance with at least one example of the present disclosure, a non-transitory computer-readable medium storing instructions for generating a collaboration object is provided. The instructions when executed by one or more processors of a computing device, cause the computing device to perform a method comprising detecting an intent to generate a meeting invitation for a meeting via a first application, providing a meeting invitation template including one or more collaborative components, receiving a selection of one or more collaborative components, the one or more collaborative components including an agenda collaborative component, note collaborative component, and action item collaborative component, each collaborative component providing functionality for concurrent multi-user interaction, causing the meeting invitation to be sent to at least one invitee via the first application, in response to the meeting invitation being sent to at least one invitee, generating the collaboration object associated with the meeting based on the one or more selected collaborative components, determining one or more additional collaborative components that are relevant to the meeting based on temporal factors and/or contextual factors using a generative machine learning model, and updating the collaboration object to include the one or more additional collaborative components.

In accordance with at least one aspect of the above non-transitory computer-readable medium, the instructions when executed by one or more processors further cause the computing device to perform the method comprising receiving an indication to join the meeting via a second application, determining one or more collaborative components that are deemed relevant based on temporal factors and/or contextual factors, retrieving the one or more relevant collaborative components and metadata from the collaboration object, and rendering a collaborative user experience (UX) comprising the one or more relevant collaborative components based on the metadata via the second application, wherein the temporal factors include whether the determination of the one or more relevant collaborative components to be retrieved are being made before, during, or after the meeting, and the contextual factors include a type of application or a type of the meeting.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

What is claimed is:

1. A method for generating a collaboration object, the method comprising:

detecting an indication to generate a meeting invitation for a meeting by a meeting organizer via a first application;

generating, by the first application, the meeting invitation based on a meeting invitation template to include a selected collaborative component, the collaborative component providing functionality for concurrent multi-user interaction in near-real time;

causing the meeting invitation to be sent to at least one invitee via the first application;

in response to causing the meeting invitation to be sent to at least one invitee, generating the collaboration object associated with the meeting based on the selected collaborative component; and as a result of a change to the collaboration object by the at least one invitee via a second application, displaying, in near real-time, the change within the meeting invitation via the first application.

2. The method of claim 1, wherein generating the meeting invitation comprises updating the meeting invitation template to populate the selected collaborative component for receiving content.

3. The method of claim 1, wherein the collaboration object comprises pointers to the selected collaborative component, an additional collaborative component associated with the collaboration object after generation of the meeting invite, and content associated with the meeting.

4. The method of claim 3, wherein the additional collaborative component is determined from a plurality of collaborative components based on temporal factors and/or contextual factors using a generative machine learning model.

5. The method of claim 4, wherein the temporal factors include whether the determination of the additional collaborative component is being made before, during, or after the meeting, and the contextual factors include a type of application or a type of the meeting.

6. The method of claim 3, wherein the additional collaborative component is determined from a plurality of collaborative components based on relevance to the meeting using a heuristic technique.

7. The method of claim 5, wherein using the generative machine learning model includes:

determining one or more contents that have been shared between the meeting organizer and the at least one invitee that are relevant to the meeting; and determining the additional collaborative component from the plurality of collaborative components based on the one or more contents.

8. The method of claim 1, further comprising:

receiving an indication to join the meeting via a third application;

determining a second set of collaborative components that are deemed relevant based on temporal factors and/or contextual factors;

retrieving the second set of collaborative components and metadata from the collaboration object; and rendering a collaborative user experience (UX) comprising the second set of collaborative components based on the metadata via the third application, wherein the temporal factors include whether the determination of the second set of collaborative components to be retrieved are being made before, during, or after the meeting, and the contextual factors include a type of application or a type of the meeting.

9. The method of claim 8, further comprising:

receiving user input to the second set of collaborative components by a first participant at a first user device;

automatically causing the user input to the second set of collaborative components to be reflected in near real-time at a second user device associated with a second participant; and persisting the collaboration object to enable concurrent multi-user interaction with the second set of collaborative components after the collaboration.

10. The method of claim 8, further comprising:

detecting content shared by a second participant during the collaboration; and automatically causing the shared content to be associated with the collaboration object.

11. A computing device for generating a collaboration object, the computing device comprising:

a processor; and a memory having a plurality of instructions stored thereon that, when executed by the processor, causes the computing device to:

detect an indication to generate a meeting invitation for a meeting by a meeting organizer via a first application;

generating the meeting invitation based on a meeting invitation template to include a selected first set of collaborative components from a plurality of collaborative components, wherein each collaborative component of the plurality of collaborative components provides functionality for concurrent multi-user interaction in near real-time;

cause the meeting invitation to be sent to at least one invitee via the first application;

in response to the meeting invitation being sent to at least one invitee, generate the collaboration object associated with the meeting based on the first set of collaborative components; and as a result of a change to the collaboration object by the at least one invitee via a second application, displaying, in near real-time, the change within the meeting invitation via the first application.

12. The computing device of claim 11, wherein the collaboration object comprises pointers to the first set of collaborative components, additional collaborative components, and its content associated with the meeting.

13. The computing device of claim 11, wherein the one or more additional collaborative components are determined from the plurality of collaborative components by using a generative machine learning model to:

determine one or more contents that have been shared between the meeting organizer and the at least one invitee that are relevant to the meeting; and determine the one or more additional collaborative components from the plurality of collaborative components based on the one or more contents.

14. The computing device of claim 11, wherein the one or more additional collaborative components are determined from the plurality of collaborative components by using a generative machine learning model includes to:

determine one or more additional collaborative components that are relevant to the meeting based on temporal factors and/or contextual factors, wherein the temporal factors include whether the determination of the one or more additional collaborative components are being made before, during, or after the meeting, and the contextual factors include a type of application, a type of the meeting, or shared contents between the meeting organizer and the at least one invitee.

15. The computing device of claim 11, further comprising instructions stored thereon that, when executed by the processor, causes the computing device to:

receive an indication to join the meeting via a third application;

determine a second set of collaborative components that are deemed relevant based on temporal factors and/or contextual factors;

retrieve the second set of collaborative components and metadata from the collaboration object; and render a collaborative user experience (UX) comprising the second set of collaborative components based on the metadata via the third application, wherein the temporal factors include whether the determination of the second set of collaborative components to be retrieved are being made before, during, or after the meeting, and the contextual factors include a type of application or a type of the meeting.

16. The computing device of claim 15, further comprising instructions stored thereon that, when executed by the processor, causes the computing device to:

receive user input to the second set of collaborative components by a first participant at a first user device;

automatically cause the user input to the second set of collaborative components to be reflected in near real-time at a second user device associated with a second participant; and persist the collaboration object to enable concurrent multi-user interaction with the second set of collaborative components after the collaboration.

17. The computing device of claim 15, further comprising instructions stored thereon that, when executed by the processor, causes the computing device to:

detect content shared by a second participant during the collaboration; and automatically cause the shared content to be associated with the collaboration object.

18. A non-transitory computer-readable medium storing instructions for generating a collaboration object, the instructions when executed by one or more processors of a computing device, cause the computing device to perform a method comprising:

detecting an indication to generate a meeting invitation for a meeting via a first application;

generating the meeting invitation based on the meeting invitation template to include one or more collaborative components selected from a plurality of collaborative components, wherein each collaborative component of the plurality of collaborative components provides functionality for concurrent multi-user interaction via the collaborative component and is dynamically updated in near real-time with changes before, during, and after the meeting;

causing the meeting invitation to be sent to at least one invitee via the first application;

in response to the meeting invitation being sent to at least one invitee, generating the collaboration object associated with the meeting based on the one or more selected collaborative components; and as a result of a change to the collaboration object by the at least one invitee via a second application, displaying, in near real-time, the change within the meeting invitation via the first application.

19. The non-transitory computer-readable medium of claim 18, wherein the instructions when executed by the one or more processors further cause the computing device to perform the method comprising:

receiving an indication to join the meeting via a third application;

determining one or more collaborative components that are deemed relevant based on temporal factors and/or contextual factors;

retrieving the one or more relevant collaborative components and metadata from the collaboration object; and rendering a collaborative user experience (UX) comprising the one or more relevant collaborative components based on the metadata via the third application, wherein the temporal factors include whether the determination of the one or more relevant collaborative components to be retrieved are being made before, during, or after the meeting, and the contextual factors include a type of application or a type of the meeting.

20. The non-transitory computer-readable medium of claim 18, wherein the plurality of collaborative components includes at least one of an agenda collaborative component, a note collaborative component, or an action item collaborative component.

* * * * *